US009856178B2

(12) United States Patent
Burnham et al.

(10) Patent No.: US 9,856,178 B2
(45) Date of Patent: Jan. 2, 2018

(54) HIGH VALUE ORGANIC CONTAINING FERTILIZERS AND METHODS OF MANUFACTURE

(71) Applicant: Anuvia Plant Nutrients Corporation, Zellwood, FL (US)

(72) Inventors: Jeffrey C. Burnham, Marco Island, FL (US); Gary L. Dahms, Mesquite, NV (US); Barry R. Jarrett, Olive Branch, MS (US); Larry S. Murphy, Manhattan, KS (US)

(73) Assignee: Anuvia Plant Nutrients Corporation, Zellwood, FL (US)

( * ) Notice: Subject to any disclaimer, the term of this patent is extended or adjusted under 35 U.S.C. 154(b) by 0 days.

(21) Appl. No.: 15/174,491

(22) Filed: Jun. 6, 2016

(65) Prior Publication Data
US 2016/0355443 A1    Dec. 8, 2016

Related U.S. Application Data

(60) Provisional application No. 62/171,541, filed on Jun. 5, 2015.

(51) Int. Cl.
| | |
|---|---|
| *C05C 3/00* | (2006.01) |
| *C05G 3/00* | (2006.01) |
| *C05D 1/00* | (2006.01) |
| *C05G 3/02* | (2006.01) |
| *C05D 9/00* | (2006.01) |
| *C05D 9/02* | (2006.01) |
| *C05C 9/02* | (2006.01) |
| *C05F 3/00* | (2006.01) |
| *C05F 11/00* | (2006.01) |
| *C05G 1/00* | (2006.01) |

(52) U.S. Cl.
CPC ............... *C05C 3/005* (2013.01); *C05C 9/02* (2013.01); *C05D 1/005* (2013.01); *C05D 9/00* (2013.01); *C05D 9/02* (2013.01); *C05F 3/00* (2013.01); *C05F 11/00* (2013.01); *C05G 1/00* (2013.01); *C05G 3/00* (2013.01); *C05G 3/02* (2013.01); *Y02P 20/145* (2015.11)

(58) Field of Classification Search
CPC .......... C05C 3/005; C05C 9/02; C05D 1/005; C05D 9/00; C05D 9/02; C05F 11/00; C05F 3/00; C05G 1/00; C05G 3/00; C05G 3/02; Y02P 20/145
USPC ........................................................ 504/102
See application file for complete search history.

(56) References Cited

U.S. PATENT DOCUMENTS

| | | |
|---|---|---|
| 143,310 A | 9/1873 | Storer |
| 2,026,969 A | 1/1936 | Flynn et al. |
| 2,568,901 A | 9/1951 | Stengel et al. |
| 2,662,881 A | 12/1953 | Batdorf et al. |
| 2,755,176 A | 7/1956 | Pearce et al. |
| 2,800,457 A | 7/1957 | Green et al. |
| 2,800,458 A | 7/1957 | Green et al. |
| 2,864,685 A | 12/1958 | Waters et al. |
| 2,902,342 A | 9/1959 | Kerley et al. |
| 3,050,383 A | 8/1962 | Wilson et al. |
| 3,259,482 A | 7/1966 | Hansen et al. |
| 3,264,088 A | 8/1966 | Hansen et al. |
| 3,264,089 A | 8/1966 | Hansen et al. |
| 3,304,588 A | 2/1967 | Mcilvaine et al. |
| 3,345,288 A | 10/1967 | Heinrich et al. |
| 3,475,154 A | 10/1969 | Kato et al. |
| 3,476,683 A | 11/1969 | Liljegren et al. |
| 3,655,395 A | 4/1972 | Karnemaat et al. |
| 3,756,784 A | 9/1973 | Pittwood |
| 3,796,669 A | 3/1974 | Kiritani et al. |
| 3,837,872 A | 9/1974 | Conner |
| 3,915,853 A | 10/1975 | Luck |
| 3,939,280 A | 2/1976 | Karnemaat |
| 3,942,970 A | 3/1976 | O'Donnell |
| 3,960,718 A | 6/1976 | Lebo |

(Continued)

FOREIGN PATENT DOCUMENTS

| | | |
|---|---|---|
| EP | 0143392 | 6/1985 |
| EP | 0356781 | 3/1990 |

(Continued)

OTHER PUBLICATIONS

U.S. Appl. No. 14/642,842, filed Jul. 9, 2015, Dahms.
U.S. Appl. No. 14/990,038, filed May 19, 2016, Burnham.
U.S. Appl. No. 13/104,127, filed Nov. 3, 2011, Burnham, et al.
U.S. Appl. No. 15/130,633, Burnham, et al.
PCT Search Report and Written Opinion for PCT/US16/36043, dated Sep. 9, 2016.
U.S. Appl. No. 08/520,959, Burnham; Jeffrey C.
U.S. Appl. No. 08/532,273, Burnham; Jeffrey C.
U.S. Appl. No. 10/854,677, filed Feb. 24, 2005, Burnham et al.
U.S. Appl. No. 13/103,637, filed Aug. 19, 2012, Burnham.
U.S. Appl. No. 13/104,127, filed Nov. 3, 2011, Burnham et al.

(Continued)

*Primary Examiner* — Johann R Richter
*Assistant Examiner* — Courtney A Brown
(74) *Attorney, Agent, or Firm* — Remenick PLLC

(57) ABSTRACT

The invention is directed to manufacturing fertilizers having commercial levels of nitrogen reacted with organic substances. The process comprises treatment of organics with acid that acidifies and heats a mix causing the hydrolysis of polymers. The acidified organic mix is injected sequentially with a nitrogen base under conditions that result in a partially neutralized melt. The sterilized and liquefied organic matter is disbursed over recycled material for production of granules in a granulator before final drying. The process is green scalable, and safe for the location of community organics processing facilities in locations without generating a nuisance to local communities. Fertilizers also provide a green, dual nitrogen-release profile when applied to crops releasing a bolus of nitrogen over one to two weeks following application followed by a continued slow or enhanced efficiency release of nitrogen over a growing season.

47 Claims, 15 Drawing Sheets

(56) References Cited

U.S. PATENT DOCUMENTS

| | | |
|---|---|---|
| 3,966,450 A | 6/1976 | O'Neill et al. |
| 4,001,140 A | 1/1977 | Foris et al. |
| 4,076,515 A | 2/1978 | Rickard |
| 4,079,003 A | 3/1978 | Manchak |
| 4,100,103 A | 7/1978 | Foris et al. |
| 4,108,771 A | 8/1978 | Weiss |
| 4,124,405 A | 11/1978 | Quienot |
| 4,134,750 A | 1/1979 | Norton et al. |
| 4,154,593 A | 5/1979 | Brown et al. |
| 4,180,459 A | 12/1979 | Zievers |
| 4,219,347 A | 8/1980 | Young |
| 4,230,568 A | 10/1980 | Chappell |
| 4,249,929 A | 2/1981 | Kneer |
| 4,270,279 A | 6/1981 | Roediger |
| 4,304,588 A | 12/1981 | Moore, Jr. |
| 4,306,978 A | 12/1981 | Wurtz |
| 4,377,406 A | 3/1983 | Achorn et al. |
| 4,377,486 A | 3/1983 | Barrick et al. |
| 4,405,354 A | 9/1983 | Thomas, II et al. |
| 4,454,259 A | 6/1984 | Reischl et al. |
| 4,500,428 A | 2/1985 | Lynch et al. |
| 4,514,307 A | 4/1985 | Chestnut et al. |
| 4,519,831 A | 5/1985 | Moore |
| 4,541,986 A | 9/1985 | Schwab et al. |
| 4,551,166 A * | 11/1985 | Behnke .............. C05C 9/02 71/30 |
| 4,554,002 A | 11/1985 | Nicholson |
| 4,601,863 A | 7/1986 | Shioi et al. |
| 4,619,684 A | 10/1986 | Salladay et al. |
| 4,655,932 A | 4/1987 | Roslonski |
| 4,659,472 A | 4/1987 | Nordlund et al. |
| 4,711,659 A | 12/1987 | Moore |
| 4,743,287 A | 5/1988 | Robinson |
| 4,772,490 A | 9/1988 | Kogler et al. |
| 4,781,842 A | 11/1988 | Nicholson |
| 4,786,307 A | 11/1988 | Marihart, Jr. |
| 4,792,349 A | 12/1988 | Trimm et al. |
| 4,793,927 A | 12/1988 | Meehan et al. |
| 4,902,431 A | 2/1990 | Nicholson et al. |
| 4,966,706 A | 10/1990 | Gregor |
| 4,997,572 A | 3/1991 | Wurtz |
| 5,013,458 A | 5/1991 | Christy, Sr. et al. |
| 5,051,031 A | 9/1991 | Schumacher et al. |
| 5,087,375 A | 2/1992 | Weinwurm |
| 5,102,556 A * | 4/1992 | Wong .............. C02F 1/705 210/711 |
| 5,118,337 A | 6/1992 | Bleeker |
| 5,125,951 A | 6/1992 | Lahoda et al. |
| 5,135,664 A | 8/1992 | Burnham |
| 5,147,563 A | 9/1992 | Long, Jr. et al. |
| 5,183,577 A | 2/1993 | Lehmann |
| 5,238,480 A | 8/1993 | Rehberg et al. |
| 5,252,116 A | 10/1993 | Markham et al. |
| 5,259,977 A | 11/1993 | Girovich et al. |
| 5,275,733 A | 1/1994 | Burnham |
| 5,340,376 A | 8/1994 | Cunningham |
| 5,342,442 A | 8/1994 | Nechvatal et al. |
| 5,346,527 A | 9/1994 | Rehbein et al. |
| 5,356,540 A | 10/1994 | Khan et al. |
| 5,385,673 A | 1/1995 | Fergen |
| 5,393,317 A | 2/1995 | Robinson |
| 5,401,402 A | 3/1995 | Christy et al. |
| 5,409,605 A | 4/1995 | Haley et al. |
| 5,417,861 A | 5/1995 | Burnham |
| 5,419,839 A | 5/1995 | Haley et al. |
| 5,422,015 A | 6/1995 | Angell et al. |
| 5,435,923 A | 7/1995 | Girovich |
| 5,443,613 A | 8/1995 | Robinson |
| 5,466,273 A | 11/1995 | Connell |
| 5,500,044 A | 3/1996 | Meade et al. |
| 5,554,279 A | 9/1996 | Christy |
| 5,556,445 A | 9/1996 | Quinn et al. |
| 5,580,458 A | 12/1996 | Yamasaki et al. |
| 5,593,590 A | 1/1997 | Steyskal |
| 5,593,591 A | 1/1997 | Ohsol et al. |
| 5,603,842 A | 2/1997 | Whitaker et al. |
| 5,618,442 A | 4/1997 | Christy |
| 5,635,069 A | 6/1997 | Boss et al. |
| 5,669,969 A | 9/1997 | Meade et al. |
| 5,679,129 A | 10/1997 | Hon |
| 5,681,481 A | 10/1997 | Christy et al. |
| 5,722,721 A | 3/1998 | Batoff et al. |
| 5,733,355 A | 3/1998 | Hibino et al. |
| 5,766,302 A | 6/1998 | Lefroy et al. |
| 5,783,073 A | 7/1998 | Christy et al. |
| 5,807,724 A | 9/1998 | Resnick |
| 5,849,060 A | 12/1998 | Diping et al. |
| 5,853,450 A | 12/1998 | Burnham et al. |
| 5,853,590 A | 12/1998 | Burnham |
| 5,862,610 A | 1/1999 | Lipert |
| 5,876,613 A | 3/1999 | Bonnin et al. |
| 5,906,750 A | 5/1999 | Haase |
| 5,916,448 A | 6/1999 | Fergen |
| 5,984,992 A | 11/1999 | Greer et al. |
| 5,993,505 A | 11/1999 | Tijsma et al. |
| 6,051,411 A | 4/2000 | Turtakovsky et al. |
| 6,103,191 A | 8/2000 | Luker |
| 6,117,406 A | 9/2000 | Vogel et al. |
| 6,159,263 A | 12/2000 | Greer et al. |
| 6,165,550 A | 12/2000 | Markusch et al. |
| 6,176,891 B1 | 1/2001 | Komoriya et al. |
| 6,187,074 B1 | 2/2001 | von Locquenghien et al. |
| 6,237,246 B1 | 5/2001 | Millard |
| 6,237,264 B1 | 5/2001 | Gulick, Jr. |
| 6,256,902 B1 | 7/2001 | Flaherty et al. |
| 6,284,278 B1 | 9/2001 | Waldman et al. |
| 6,325,035 B1 | 12/2001 | Codina et al. |
| 6,331,300 B1 | 12/2001 | Dybas et al. |
| 6,398,840 B1 | 6/2002 | Orta-Castro et al. |
| 6,406,510 B1 | 6/2002 | Burnham |
| 6,409,788 B1 | 6/2002 | Sower |
| 6,409,789 B1 | 6/2002 | Gilbert |
| 6,461,399 B1 | 10/2002 | Connell |
| 6,465,706 B1 | 10/2002 | Rogers et al. |
| 6,517,599 B2 | 2/2003 | Gilbert |
| RE38,238 E | 8/2003 | Nicholson et al. |
| 6,623,650 B2 | 9/2003 | Millard |
| 6,666,154 B2 | 12/2003 | Logan et al. |
| 6,716,360 B2 | 4/2004 | Titmas |
| 6,752,848 B2 | 6/2004 | Logan et al. |
| 6,752,849 B2 | 6/2004 | Logan et al. |
| 6,758,879 B2 | 7/2004 | Greer et al. |
| 6,841,515 B2 | 1/2005 | Burnham |
| 6,852,142 B2 | 2/2005 | Varshovi |
| 6,966,941 B1 | 11/2005 | Grobler et al. |
| 7,128,880 B2 | 10/2006 | Dahms et al. |
| 7,497,956 B2 | 3/2009 | Blais et al. |
| 7,513,927 B2 | 4/2009 | Faulmann et al. |
| 7,604,742 B2 | 10/2009 | Shankar et al. |
| 7,662,205 B2 | 2/2010 | Burnham |
| 7,662,206 B2 | 2/2010 | Burnham |
| 7,789,931 B2 | 9/2010 | Burnham et al. |
| 7,947,104 B2 | 5/2011 | Burnham et al. |
| 7,947,105 B2 | 5/2011 | Burnham |
| 8,057,569 B2 | 11/2011 | Burnham et al. |
| 8,105,413 B2 | 1/2012 | Burnham |
| 8,192,519 B2 | 6/2012 | Burnham |
| 8,202,342 B2 | 6/2012 | Burnham |
| 8,470,065 B1 | 7/2013 | Burnham |
| 8,491,693 B2 | 7/2013 | Burnham |
| 8,597,394 B2 | 12/2013 | Burnham |
| 8,920,733 B2 | 5/2014 | Burnham et al. |
| 8,864,868 B2 | 6/2014 | Burnham |
| 8,992,654 B2 | 3/2015 | Burnham et al. |
| 9,233,882 B2 | 1/2016 | Burnham |
| 9,328,030 B2 | 5/2016 | Burnham et al. |
| 2002/0098982 A1 | 7/2002 | Burnham |
| 2002/0157439 A1 | 10/2002 | Gilbert |
| 2003/0070460 A1 | 4/2003 | Logan et al. |
| 2003/0089151 A1 | 5/2003 | Logan et al. |
| 2003/0121302 A1 | 7/2003 | Oliver et al. |
| 2003/0136165 A1 | 7/2003 | Logan et al. |
| 2004/0065127 A1 | 4/2004 | Connell |
| 2004/0120867 A1 | 6/2004 | Dahms et al. |

(56) References Cited

U.S. PATENT DOCUMENTS

| | | |
|---|---|---|
| 2004/0177664 A1 | 9/2004 | Hale |
| 2005/0005660 A1 | 1/2005 | Burnham et al. |
| 2005/0019207 A1 | 1/2005 | Oliver et al. |
| 2005/0039508 A1 | 2/2005 | Burnham et al. |
| 2005/0077245 A1 | 4/2005 | Blais et al. |
| 2005/0138978 A1 | 6/2005 | Porubcan |
| 2006/0243009 A1 | 11/2006 | Burnham |
| 2006/0254331 A1* | 11/2006 | Burnham ............... C05C 3/00 71/11 |
| 2007/0062233 A1 | 3/2007 | Burnham |
| 2007/0257715 A1 | 11/2007 | Semerdzhiev et al. |
| 2008/0000279 A1 | 1/2008 | Faulmann et al. |
| 2008/0034822 A1 | 2/2008 | Burnham et al. |
| 2008/0230484 A1 | 9/2008 | Burnham et al. |
| 2010/0139345 A1 | 6/2010 | Burnham |
| 2010/0139346 A1 | 6/2010 | Burnham |
| 2010/0288003 A1 | 11/2010 | Burnham et al. |
| 2012/0247164 A1 | 10/2012 | Dahms et al. |
| 2014/0323297 A1 | 10/2014 | Harman et al. |
| 2015/0135785 A1 | 5/2015 | Wang et al. |

FOREIGN PATENT DOCUMENTS

| | | |
|---|---|---|
| EP | 0557078 | 8/1993 |
| WO | WO8102888 | 10/1981 |
| WO | WO9856735 | 12/1998 |
| WO | WO9947282 | 9/1999 |
| WO | WO0136082 | 5/2001 |
| WO | WO0136887 | 5/2001 |
| WO | WO0168562 | 9/2001 |
| WO | WO0169150 | 9/2001 |
| WO | WO03045852 | 6/2003 |
| WO | WO2004094320 | 11/2004 |
| WO | WO2008101250 | 8/2008 |

OTHER PUBLICATIONS

U.S. Appl. No. 12/981,933, filed Jun. 30, 2011, Burnham et al.
U.S. Appl. No. 13/349,967, filed Jun. 25, 2013, Burnham.
U.S. Appl. No. 60/654,957, Burnham.
U.S. Appl. No. 60/659,434, Burnham.
U.S. Appl. No. 60/700,730, Burnham.
U.S. Appl. No. 60/704,458, Burnham.
U.S. Appl. No. 14/642,842, filed Jul. 9, 2015, Dahms et al.

* cited by examiner

ORGANICALLY MODIFIED AMMONIUM SULFATE FERTILIZER
PHYSICAL AND CHEMICAL CHARACTERISTICS

GRANULES (PREFERRED SIZES FROM 0.7MM TO 3.0)
HIGH HARDNESS (RANGE FROM 5.0 TO 8.0 CRUSH STRENGTH)
LOW MOISTURE (DRYNESS FROM 92% TO 99%)
DUST FREE
NON-COMBUSTIBLE
PATHOGEN FREE (MANUFACTURED PRODUCT IS STERILE)
ABRASION RESISTANT
LOW METAL CONCENTRATIONS (ACHIEVES USEPA EQ REGS)
ORGANIC - 4 TO 20% BY DRY WEIGHT
NITROGREN - 6 TO 20% BY DRY WEIGHT
PHOSPHORUS - 0 TO 10% BY DRY WEIGHT
POTASSIUM - 0 TO 5% BY DRY WEIGHT
SULFUR - 9 TO 25% BY DRY WEIGHT
IRON - 0% TO 10% BY DRY WEIGHT

*FIG. 4*

HIGH VALUE ORGANIC CONTAINING FERTILIZERS AND METHODS OF MANUFACTURE

REFERENCE TO RELATED APPLICATIONS

This application claims priority to U.S. Provisional Application No. 62/171,541 entitled "High Value Fertilizers and Methods of Manufacture" filed Jun. 5, 2015, the entirety of which is hereby incorporated by reference.

BACKGROUND

1. Field of the Invention

This invention is directed to methods, systems, and processes for the manufacturing of fertilizer and the fertilizer product manufactured by these methods. In particular, the invention is also directed to the manufacture of fertilizers with predetermined concentrations or absences of nitrogen, phosphate and/or potassium.

2. Description of the Background

The disposition of municipal organics is a huge problem in society today. Wastewater sludge, for example, is estimated to be produced at a rate of over 7.5 million dry metric tons annually or roughly about 64 dry pounds of biosolids for every individual in the United States. The term sludge has been replaced with the term biosolid which can include all forms of municipal organic wastes such as, for example, domestic septage, farm and factory organic wastes that are collected or otherwise find their way to waste-water treatment, sewer run offs, pharmaceutical wastes including fermentation and processing wastes, microbial digests, food wastes and food byproducts, animal manures, digested animal manures, organic sludge, organisms and microorganisms and all combinations thereof. Most all industrial organic wastes find their way into municipal sludge or are otherwise disposed of in landfills or as may be common in the particular industry. As can be envisioned, all forms of discarded organic-containing material can and typically do wind up in municipal sludge including biologically-active molecules such as pharmaceuticals as well as their metabolized products, paper, plastics, metals and most all forms of garbage.

Wastewater biosolids are collected typically by municipalities through existing infrastructures such as sewers and other types of residential and industrial plumbing systems. Collected material is sent to one or more central facilities referred to as waste-water treatment plants. At these plants water is separated from the solids and sent through purification procedures for reclamation. The solids are either burned or transported by truck for burial or used in a land application program as a weak fertilizer. Burning or incineration and landfilling has become more common in part because of the awareness the dangers of unprocessed biosolids. In all biosolids are assumed to be not only harmful chemicals but also bioactive compounds, and pathogens. Federal, state and local regulations exist that strictly control the handling of biosolids for the safety of both workers and the public. But whether burned or buried, such procedures are highly inefficient and extremely costly.

Burning destroys most of the harmful materials present in the biosolids, but the cost in damage to the environment is always tremendous. Incinerators have been built specifically to deal with municipal waste. These incinerators create huge amounts of contaminated smoke spoiling the air within hundreds of square miles around the facility. The smoke that's emitted contains whatever contaminants as were present in the biosolids such as metals and other non-combustible components. Those contaminants settle onto fields and bodies of water creating ecological nightmares around the plants and sometimes for great distances down-wind of the plants. Although burning can produce energy, energy production is highly inefficient requiring huge amounts of biosolids to become cost effective. The amount of energy produced is always small in comparison to the amount of material incinerated. Even after burning, large amounts of ash remain that must be removed and disposed. As compared to the original biosolid, the ash is devoid of any positive impact to the environment whatsoever and is simply and unceremoniously buried. Overall burning negatively increases the impact of biosolid disposal to the environment and for many years into the future.

Biosolids that have been treated to some degree of processing are classified according to federal standards established by the United States Environmental Protection Agency as Class A or Class B with regard to microbial safety. "Class A" biosolids are considered free of detectable pathogens and sufficiently safe as a fertilizer for animal or human crop usage. Pathogens such as, for example, *Salmonella* sp. bacteria, fecal coliform indicator bacteria, enteric viruses, and viable helminth ova must be below published levels. When pathogen indicator organisms, such as fecal coliform, can be detected in the biosolids at levels greater than one million per gram of dried product, the USEPA has classed such treated biosolids as "Class B" implying that they are of a lower standard than the "Class A" treated biosolids which must contain less than 1000 indicator organisms per gram of dried product. Because Class B biosolids contain pathogen indicators—and therefore potential pathogens, they are restricted in the manner by which they can be applied to crops intended for animal and human consumption.

The Part 503 rule (Title 40 of the Code of Federal Regulations, Part 503, incorporated herein by reference) lists six alternatives for treating biosolids so they can be classified in Class A with respect to pathogens. Alternative 1 requires biosolids to be subjected to one of four time-temperature regimes. Alternative 2 requires that biosolids processing meets pH, temperature and air-drying requirements. Alternative 3 requires that when biosolids are treated in other processes, it must be demonstrated that the process can reduce enteric viruses and viable helminthes ova, and operating conditions used in the demonstration after pathogen reduction demonstration is completed must be maintained. Alternative 4 requires that when treated in unknown processes, biosolids be tested for pathogens at the time the biosolids are used or disposed or, in certain situations, prepared for use or disposal. Alternative 5 requires that biosolids be treated in one of the Processes to Further Reduce Pathogens. Alternative 6 requires that biosolids be treated in a process equivalent to one of the Processes to Further Reduce Pathogens, as determined by the permitting authority.

Class A pathogen biosolids must also possess a density of fecal coliform of less than 1,000 most probable numbers (MPN) per gram total solids (dry-weight basis) or a density of *Salmonella* sp. bacteria of less than 3 MPN per 4 grams of total solids (dry-weight basis). Either of these two requirements must be met at one of the following times: when the biosolids are used or disposed; when the biosolids are prepared for sale or give-away in a bag or other container for land application; or when the biosolids or derived materials are prepared to meet the requirements for Exceptional Quality biosolids.

All biosolids applied to the land must meet the ceiling concentration for pollutants, comprising nine heavy metal pollutants: arsenic, cadmium, chromium, copper, lead, mercury, nickel, selenium, and zinc. If a limit for any one of these is exceeded, the biosolids cannot be applied to the land without the incorporation of significant restrictions. Exceptional Quality (EQ) is a term used by the USEPA Guide Part 503 Rule 7 to characterize biosolids that meet low-pollutant and Class A pathogen reduction (virtual absence of pathogens) limits and that have a reduced level of degradable compounds that attract vectors. Achievement of the EQ standards is an important goal for high quality products that contain an biosolids organic material.

Biosolids that are merely dried have several disadvantages for agricultural use. Biosolids have a low fertilization value, typically having nitrogen content of only about two to six percent. Volume is large and costs per unit of nitrogen are high. The heat-dried biosolids often have a disagreeable odor, particularly when moist. Also, dried pellets have low density and hardness and when blended with other commercial fertilizer materials, the pellets may segregate, and disintegrate and may not spread on the field uniformly with other more dense ingredients. The disagreeable odor associated with the use of biosolids, unless adequately treated, will continue to be present during further processing of a nitrogen rich fertilizer product, and can continue to be present in the final product. This complicates the placement of suitable fertilizer processing plants to locations that are not in close proximity to residential communities. Additionally, the longer distance that biosolids must be transported adds to the cost and logistics of disposing of this waste product. Another disadvantage to current biosolids-enhanced fertilizers is that bacterial action may continue when the material becomes moist, and under storage conditions, the material's temperature may rise to the point of auto-ignition via oxidation of contained organic materials. Hence, except for special markets that value its organic content for soil amendment or filler in blended fertilizer, there is relatively poor demand for the heat-dried biosolids product. In many cases municipalities must pay freight charges, or may offer other incentives for commercial growers to use the material. However, this is frequently still more economical than alternative disposal schemes.

The market value for agricultural fertilizers is principally based on their nitrogen and sulfur content. A need exists for a practical, safe and economic method for increasing the nitrogen and sulfur content of biosolids to a level approaching that of commercial mineral fertilizers, e.g., eight to twenty percent for nitrogen. If such a municipal organics containing fertilizer could be manufactured, then the overall value of the product and demand for the product would likely increase. Moreover, a properly manufactured organic-containing fertilizer will have an advantage in that much of its nitrogen will be of the slow-release type. A slow-release or controlled release fertilizer or Enhanced Efficiency Fertilizer ("EEF") is one in which the nutrient, e.g., nitrogen as in ammonium ions, phosphorus as phosphate and/or sulfur as sulfate, becomes available in the soil column at rates slower than fast-available nutrients as from traditional fertilizers such as urea, ammonium sulfate and diammonium phosphate. This slower action and/or prolonged availability of the nutrient in the soil column is very desirable and provides nutrients to the plant throughout the plant growing cycle with the implication that less nitrogen needs to be applied to the soil or crop thereby reducing the potential of environmental contamination and reducing the cost of fertilizer usage. Further, slow-release fertilizers are much greener than traditional inorganic fertilizers. For example, slow-release fertilizers not only provide nutrients to plants over much of their productive crop cycle they also retain more of the contained nutrients in the soil column thereby avoiding loss of the nutrients via leaching into the ground water. The more advantageous slow-release fertilizers further, do not volatize their contained nutrients, especially nitrogen, into the environment upon application to the soil environment. Traditional inorganic manufactured slow release nitrogen fertilizers have a price many times that of ordinary mineral nitrogen fertilizers. Under the scenario of high nitrogen biosolids-containing fertilizer production from their biosolids, municipalities would enjoy public and regulatory support for their biosolids disposition program. Such a program would ensure the regular removal of their dewatered or dried biosolids, for example, by recycling biosolids into a high nitrogen fertilizer which then can be sold directly into the mature national fertilizer distribution industry, thereby eliminating one of the major problems traditionally associated with biosolids treatment programs.

Prior attempts have been made to reach some of these objectives. U.S. Pat. Nos. 3,942,970, 3,655,395, 3,939,280, 4,304,588, and 4,519,831 describe processes for converting sewage biosolids to fertilizer. In each of these processes a urea/formaldehyde condensation product is formed in situ with the biosolids. Thus, the processes require the handling of formaldehyde, a highly toxic lachrymator and suspected cancer-causing agent.

Other processes require costly process equipment and/or special conditions not readily incorporated in existing sewage treatment facilities (see, Japanese Patent No. 58032638; French Patent No. 2,757,504).

A simple method for increasing the nitrogen in biosolids would be to blend commercial nitrogen fertilizer materials to the wet biosolids prior to drying and pelletizing. There are significant disadvantages to such a strategy. There are only a few high-nitrogen fertilizer materials that are economical for use in agriculture. Examples include: ammonia (82 wt. percent N), urea (46 wt. percent N–{nitrogen}), and ammonium nitrate (33.54 wt. percent N). Ammonia has high volatility and is subject to strict regulation of discharges to the atmosphere. Urea is a solid that adsorbs moisture quite readily and makes the mixed organic more difficult to dry. Urea is also highly susceptible to breakdown to ammonia by the microbes and enzymes in biosolids and the soil if they are not properly prepared, resulting in nitrogen loss and an odor problem. Ammonium nitrate is a strong oxidizer and can result in a potential explosion problem which has all but eliminated this fertilizer from the commercial market after 2001. All of these fertilizers have high nitrogen content, but are less than ideal for combining with municipal organics such as biosolids or food waste absent special processing.

Other references, such as European Patent No. 0143392, Japanese Patent No. 9110570 A2, and "Granulation of Compost from Sewage Sludge. V. Reduction of Ammonia Emission from Drying Process", Hokkaidoritsu Kogyo Shikenjo Hokoku, 287, 85-89 (1988) fail to disclose the use of acids with ammonium sulfate additions and do not discuss the issue of corrosion of steel process equipment under acid conditions.

Over the past thirty years, alkaline stabilization of biosolids has been a standard and successful method of making biosolids into beneficially useful materials that can be used principally as soil-conditioning materials. Because these alkaline stabilized biosolids products have high calcium carbonate equivalencies, they have been produced and marketed as Agricultural liming or Ag-lime materials, usually as a replacement for calcium carbonate in farm soil management strategies. Because of this usage, the value of these materials has been restricted to only a few dollars per ton of product. However, transportation costs are high in large part due to the significant water content of the finished material. Amounts of water up to fifty or sixty percent render transportation economically and geographically restricted to areas close to the source of their treatment.

Thus, there is a long standing need for practical means of increasing the economic value of municipal organic materials through increasing its nitrogen content, and increasing the ability to be spread as well as a need to treat these materials such that they are converted into commodity and specialty fertilizers with physical and chemical and nutrient properties such that they can command significant value in the national and international commodity fertilizer marketplace. A series of U.S. Patents, U.S. Pat. Nos. 5,984,992; 6,159,263; 6,758,879 and 7,128,880 describe methods of production of high nitrogen organically-enhanced ammonium sulfate fertilizers made with bio solids utilizing a pipe-cross reactor as originated by the Tennessee Valley Authority (TVA). The pipe, tee and pipe-cross reactor are defined by the International Fertilizer Development Center (IFDC) in the IFDC *Fertilizer Manual* (1998), p 440 as: "the pipe reactor consists basically of a length of corrosion-resistant pipe (about 5-15 m long) to which phosphoric acid, ammonia and often water are simultaneously added to one end through a piping configuration resembling a tee, thus the name 'tee reactor.'" The tee reactor was modified by TVA to also accept an additional flow of sulfuric acid through another pipe inlet located opposite the phosphoric acid inlet, giving the unit a "cross" configuration and thus the name "pipe-cross reactor".

Both the IFDC *Fertilizer Manual* (1998) and the *Fertilizer Technical Data Book* (2000) refer to the pipe-cross reactors. Pipe-cross reactors deliver a concentrated mix to the granulator shaping device and more efficiently evaporate undesired water from the fertilizer mix than other devices, but these references demonstrate a long-felt need for improvement, indicating that one of the shortcomings of the pipe-cross reactor is scale formation inside the pipe which can result in clogging.

The methodologies taught by this group of patents (U.S. Pat. Nos. 5,984,992; 6,159,263; 6,758,879 and 7,128,880) are plagued by problems related to the pluggage of these narrow (relative to their length) "pipe-cross" reactor configurations, the very short duration of reaction time in such "pipe-cross" reactors and the difficulty of control of the reaction temperature and pressure and retention time of the mix within such pipe-cross reactors. These pipe-cross reactors are narrow in contrast to their length, e.g., up to six to eight inches in diameter and often fifteen feet in length or longer. The plant practicing the manufacture of organically-enhanced ammonium sulfate fertilizers often had to shut down and disassemble the pipe-cross reactor either due to blockage from biosolids buildup or from destructive over heating in such reactors such that the commonly used Teflon® coating on the interior-reaction side of the reactor was melted and ruined. Further, the use of the pipe-cross reactor has the distinct disadvantage of having very short reactor retention times (usually less than twenty seconds) which is an advantage in the manufacture of traditional fertilizers like ammonium sulfate but is a disadvantage when coupled to the simultaneous processing of biosolids. Such short processing time increases the probability of untreated or non-homogenous mixing as the three material inputs pass through this reactor. Also limiting is the lack of control over the atmospheric pressure within such pipe-cross reactors since these reactors have open-ended discharges usually directly into a granulator. Related to but distinct from the lack of control of internal pressures, pipe-cross reactors also have little to no temperature control over the mix passing through the reactor.

U.S. Pat. No. 4,743,287 to Robinson describes a method to use two reaction vessels in sequence to incorporate organic biosolids into nitrogen fertilizers of low or medium nitrogen concentration (a range of four weight-percent nitrogen to a maximum of nitrogen concentration of ten weight-percent). Robinson uses his first reaction vessel to achieve very low pH values of the mixture (pH 0.2 to 1.5) to achieve hydrolysis of molecules present and to prepare the mix for reaction in a second reaction vessel. Robinson does indicate that a single reactor can be used, but only in a batch configuration and not in a continuous flow manufacturing method. Robinson also indicates that the acid and ammonia may not be injected in any order, but must be injected in sequence. This patent describes the reaction vessels capable of achieving high pressures (30 psig) with relatively long retention times as compared to the pipe-cross reactors. However, Robinson fails to meet the need for a novel and practical continuous flow method of manufacturing high nitrogen (greater than 8 wt. percent nitrogen) and biosolids-containing fertilizer products under the advantages of defined temperatures, pressures and reaction retention times.

Thus, an urgent need exists for an effective, efficient, and economical process for treating biosolids. In addition, there exists an urgent need for a variety of fertilizers that can be specifically tailored for a particular crop such that the nutrients provided by the fertilizer follow the nutrient needs of the crops during a particular period or even a growing season.

SUMMARY OF THE INVENTION

The present invention overcomes the problems and disadvantages associated with current strategies and designs, and provides new tools and methods for the manufacture of fertilizers.

One embodiment of the invention is directed to methods for manufacture of a fertilizer with a predetermined nutrient release profile comprising: conditioning an amount of an organic material to a predetermined degree of wetness, wherein the type and/or amount of organic material establishes the slow release nutrient profile of the fertilizer; adding an odor control agent to the conditioned organic material to form a mixture; transferring the mixture to a first vessel to which is added a concentrated acid creating an exothermic reaction, wherein the amount of acid added creates a predetermined temperature forming a liquid mixture; agitating the acidified mixture for a first period of time; transferring the liquid mixture under pressure to a second vessel to which is added an amount of anhydrous ammonium sufficient to further increase the temperature and pressure of the liquid mixture such that the liquid mixture contains a predetermined amount of nitrogen; agitating the liquid mixture in the second vessel for a second period of time; and discharging the liquid mixture from the second vessel to form the fertilizer with a predetermined slow release profile of nitrogen, sulfur and/or phosphorous. Preferably the nutrient release profile is a profile of the release of one or more of nitrogen, phosphorous, potassium, sulfur, iron, organics and combinations thereof, and can generally matches the growth needs of a particular crop for the one or more of nitrogen, phosphorous, potassium, sulfur, iron, organics and combinations thereof. Preferably the nutrient release profile comprises the rate, amount and/or differential of release of one or more nutrients of the fertilizer. Preferably organic material comprises one or more of municipal biosolids, heat-dried biosolids, pharmaceutical fermentation wastes, microbial digests of organic products, agricultural waste products, food stuffs and digested food stuffs, food byproducts, animal manures, digested animal manures, organic biosolids, biosolids containing microorganisms, wastewater plant biosolids, extracted liquid organic fractions from municipal solid waste, animal residuals and digested animal residuals, algae harvested from eutrophic surface water sources, iron humates containing fulvic and/or humic acids, and combinations thereof, and also that plastic and hair that may be present do not require removal before processing because they are liquified. Preferably additional ingredients are adding such as, for example, zinc sulfate and/or soluble forms of boron, nutrients, peptides, vitamins, polypeptides, amino acids, saccharides, polysaccharides, herbicides and/or pesticides to the organic material, the mixture and/or the liquid mixture. In addition, one or more agents that create and/or reduce that electrostatic state of the organic material can be added to the organic material, the mixture and/or the liquid mixture. Such agents include, but are not limited to one or more of anionic and cationic chemicals, chelating agents, ionic sequestering agents, metal ions, citric acid, amino acids, glutamic acid, histidine, lysine, glycine, peptides, proteins, sugars, saccharides and polysaccharides, iron, sulfur, phosphorous and nitrogen-binding compounds and combinations thereof. Preferably the predetermined degree of wetness comprises a percent solids of from 15-30%, and also preferably the aqueous liquid removed from the organic material is recycled. Preferably the odor control agent comprises one or more of calcium ferrate, sodium ferrate, potassium ferrate, ferrous sulfate heptahydrate, rozenite, melanterite, ferric chloride, ferrous sulfate, ferrous sulfate monohydrate, hydrogen peroxide, ozone and salts, derivatives and combinations thereof. Preferably the concentrated acid comprises sulfuric acid or phosphoric acid concentrated at 90% or greater, the amount of acid creates a temperature of 100° C. or greater, the first period of time is from 2-20 minutes, the second vessel has a pressure of 2 atmospheres or greater and a temperature of 120° C. or greater, the second period of time is 5 minutes or greater, and discharging comprises coating the liquid fertilizer onto recycled fertilizer granules (an alternative embodiment can be wherein the first and second vessels may be at or near ambient pressures). Preferably the liquid mixture has a viscosity of 2,000 cP or less that increases after addition of anhydrous ammonium. Also preferably the coated recycled fertilizer granules are dried to a solids content of 98% or greater. Preferably a hardening agent is added to the fertilizer such as, for example, lignosulfonate, molasses, alum or a combination thereof or no hardening agent is utilized. Preferably the fertilizer is formed into granules and granules are selecting granules by size. Preferably granules between 0.5 and 4 mm and selected, and granules that are of greater than 4 mm are crushed and combined with granules that are of less than 0.5 mm and comprise recycled fertilizer granules. Preferably the predetermined amount of ammonium is that amount which creates 5% or greater of nitrogen in the fertilizer.

Another embodiment of the invention is directed to fertilizer made by the methods of the invention. Preferably fertilizers, when applied to a crops, release nitrogen and other nutrients to soil at a rate slower than nitrogen release by inorganic fertilizers containing the same nutrients such as urea as a nitrogen source. Preferably the nutrients comprise one or more of nitrogen, phosphorus, potassium, sulfur, iron, manganese, magnesium, copper, calcium, selenium, boron, zinc and combinations thereof, and also preferably are chelated or electrostatically bound to the organic matter of the fertilizer. Preferably the fertilizers are homogenous in composition, non-hydroscopic and black or otherwise very dark in color. Preferably the fertilizers improve soil tilth, stress resistance of crops to heat and drought, and the micro-ecology of soil as compared to non-organic fertilizers. Also preferably, fertilizers of the invention have a hardness of between 4 and 9 pounds, more desirably between 6 and 8 pounds and/or a bulk density of between 52 and 56 pounds/cubic foot, and from 8-17% nitrogen, from 0-10% phosphorus, from 0-10% potassium, from 5-20% sulfur 5 to 20%, from 0-5% iron and from 5-20% organics. Also preferably, fertilizers, once applied to a crop, provide one or more nutrients to the crop sufficient for all or a portion of a single growing season.

Another embodiment of the invention is directed to methods for manufacture of a fertilizer comprising: providing an organic material that preferably contains municipal organics wherein the organic material has a solids content of at least eight percent; optionally adding an odor control agent to the organic material to create a mixture; adding an acid to the mixture under a first pressure and elevated temperature for a first period of time forming a liquefied mixture; adding ammonia to the liquefied mixture under a second pressure and elevated temperature for a second period of time; and processing the liquefied mixture to form the fertilizer. The phrase organic material includes all biosolids, but is not limited to biosolids such as organic biosolids, biosolids containing microorganisms, municipal biosolids or heat-dried biosolids, and also includes pharmaceutical and laboratory processing and fermentation wastes, farm and agricultural wastes, decayed and digested organic materials, mined humates and fulvic and humic acids, harvested plants including farmed crop materials such as roughage and silage of corn and soybean plants as well as wheat, rice and barley plants, algae and cyanobacteria that may be harvested from ponds and other bodies of water, bacteria, mold and fungi, industrial wastes and their by-products, microbial, chemical and enzymatic digests of organic products, plant and animal foods, food stuffs, and byproducts, recycled fertilizers, and all combinations thereof. An element of the invention is that the organic material that contains plastic and hair and similar material does not need to be removed prior to processing. Preferably, the organic material is dewatered or hydrated to a solids content of between 14 and 40 percent, more preferably the organic material has a percent dryness of about 22 percent plus or minus 5 percent. Also, a portion of the organic material may be dewatered to a dryness greater than 70 or 85 percent, and blended with the remaining portion of the organic material to achieve a desired percent dryness. Preferably, the organic material is hydrated with process water recovered from one or more steps of the method to minimize or prevent any loss of nutrient-containing water.

Optionally, odor control agents may be added to the organic material. Preferred odor control agents include, but are not limited to one or more of calcium ferrate, sodium ferrate, potassium ferrate, ferrous sulfate heptahydrate, rozenite, melanterite, ferric chloride, ferrous sulfate, ferrous sulfate monohydrate, ferrous sulfate heptahydrate, ferric humate, hydrogen peroxide, ozone and salts, derivatives and combinations thereof, as well as various salts thereof. Preferably, the mixture of the organic material with the odor control agent forms a thixotropic mixture. The mixture may be optionally heated prior to the addition of acid, which is useful in climates where the organics are maintained at about 4° C. (about 40° F.). Also preferably, process heating is performed in a first pressure vessel and the first pressure is maintained at between 20 and 60 psig, the first temperature is between 66° C. (150° F.) and 127° C. (260° F.), and the first period of time is between 2 minutes and 30 minutes. More preferably, the first temperature may be between 93° C. (200° F.) and 121° C. (250° F.) and the first period of time may be between 5 minutes and 10 minutes. Preferably the viscosity of the acidified and heated mixture is about 1000 cP or less. The acid added to the mixture is preferably a phosphoric acid, a sulfuric acid, or a combination thereof. After acidification, the liquefied mixture is transferred to a second pressure vessel and, preferably, ammonia is heated under pressure to form a gas prior to being added to the liquefied mixture. The preferred second temperature in the second pressure vessel is between 121° C. (250° F.) and 199° C. (390° F.), the preferred second period of time is between 1 minute and 30 minutes, and the preferred pressure within the second pressure vessel is maintained at between 30 and 150 psig. The viscosity of the ammoniated mixture is preferably about 1,200 cP or less. Processing of liquefied mixture comprises forming the usable fertilizer. Preferably, the processing comprises drying the combination to a solids content of greater than 92 percent, or more preferably to a solids content is at least 98 percent. One or more hardening agents may be added during processing such as, for example, ligno-sulfonate, molasses, alum or a combination thereof. Preferably processing is performed in a granulator to form granules and the granules are sized and granules of between 0.5 and 4 mm selected. Preferably, granules of greater than 4 mm are further crushed, and combined with granules of less than 0.5 mm and both are added during processing. An element of the invention is that each step of the method can be performed in a continuous process without interruption, although batch processing is also possible. The processes of the invention preferably also comprise a dust control system that collects and recycles dust material created from the processing.

Another embodiment of the invention is directed to fertilizer manufactured by the methods of the invention. Fertilizers will typically contain hydrolyzed polymers of one or more of plastics, pharmaceutical compounds, antibiotics, hormones, hormone-like molecules, biologically active compounds, macromolecules, carbohydrates, nucleic acids, fats, lipids, proteins, and microorganisms that are present in the biosolids. Preferably the hydrolyzed polymers are various chain length polypeptides and amino acids, most of which are not destroyed during the method of processing, that supplement and substantially increase the value of the fertilizer. Preferably, fertilizer of the invention has a nitrogen content of between 6 and 20 percent, a phosphate content of between 0 and 10 percent, a potassium content of between 0 and 5 percent, a sulfur content of between 9 and 25 percent, an iron content of between 0 and 10 percent, and an organic content of between 4 and 30 percent. Also preferably, the fertilizer has no or almost no unpleasant or disagreeable odors.

Another embodiment of the invention is directed to processes for manufacture of a fertilizer with a predetermined content of one or more of nitrogen, phosphate and potassium comprising: providing an organic material containing biosolids wherein the organic material has a solids content of at least eight percent; optionally adding an odor control agent to the organic material to create a mixture; adding an amount of a predetermined acid to the mixture, thereby creating an exothermic heat-of-hydration reaction and forming a liquefied mixture; adding a predetermined amount of ammonia to the liquefied mixture under a pressure and heating the mixture to a second temperature for a second period of time, wherein the amount of ammonia added is determined from the composition of the organic material and the amount of acid contained; and processing the liquefied mixture to form the fertilizer with a determined pH that is soil and crop compatible with predetermined content of one or more of nitrogen, phosphate, potassium and sulfur. The process of the invention may optionally further comprise adding one or more plant nutrients to during processing. Such plant nutrients that can be added include, but are not limited to one or more of urea, ammonium nitrate, ammonium sulfate, monoammonium phosphate, diammonium phosphate, urea ammonium nitrate, liquid urea, potash, iron oxide, soluble iron, chelated iron and combinations thereof. The process preferably further comprises adding and one or more hardening agents during processing such as, for example, ferric oxides, alum, attapulgite clay, industrial molasses, lignin, ligno sulfonate, urea formaldehyde polymerizer and combinations thereof. The process may also be performed without a hardening agent such as, for example, when the granules produced are of acceptable hardness for use.

Another embodiment of the invention is directed to systems for the manufacture of a fertilizer comprising: a mixer that blends municipal organics with an odor control agent; a first reaction or pressure vessel wherein the blended organic materials are mixed with an acid and heated to a first predetermined temperature and pressurized to a first predetermined pressure for a period of time forming a liquid; a second reaction or pressure vessel wherein the liquid is mixed with ammonia from an ammonia source and heated to a second predetermined temperature and pressurized to a second predetermined pressure for a second period of time; and a rotary granulator wherein the ammoniated liquid is mixed with preformed granules to form dried granules of the fertilizer. Preferably the ammonia source is liquefied or gaseous ammonia under pressure and the first and second reaction or pressure vessels each contain an agitator. The systems may also include a screening process to select product sized fertilizer granules, and one or more of a cooling and coating apparatus to reduce temperature and control dust prior to storage. Optionally, the cooler may include an ozone generator that provides ozone to the cooling fertilizer to eliminate or at least substantially reduce remaining disagreeable odors. Preferably, systems also comprise a conveyer for transporting municipal organics to the mixer and another conveyer for transporting the blended organics to the first reaction or pressure vessel; a pressurized piping system that transports acidified biosolids from the first reaction or pressure vessel to the second reaction or pressure vessel, ammonia into the second reaction or pressure vessel; and disperses the ammoniated liquid, usually as a spray, into the granulator. Preferred systems further comprise one or more screens for selecting granules of a predetermined size and a rotary cooler for cooling and polishing the sized granules, and both a dust control apparatus that collects and recycles dust from the granulator and a water recovery system whereby water extracted from biosolids during processing is recovered and recycled. In certain embodiments, the first and/or second reaction or pressure vessel may be a pipe-cross reactor, or both reaction and pressure vessels are pipe-cross reactors. The process may be performed as a continuous or batch process.

Another embodiment of the invention is directed to methods for manufacture of a product comprising: providing an organic material wherein the organic material has a solids content of at least eight percent; adding an acid to the organic material under an elevated temperature for a first period of time forming a liquefied mixture; adding ammonia to the liquefied mixture under a pressure and elevated temperature for a second period of time; and processing the liquefied mixture to form the fertilizer. Preferably the organic material is plant or bacterial material and or food or digested food material, also preferably, the plant or bacterial material is algae, bacteria, fungi or a combination thereof. Preferably there are toxic materials present in the organic materials that are hydrolyzed or otherwise rendered nontoxic or inactivated by the process of the invention. Preferably there may be only ambient pressure in the first vessel when the elevated temperature is between 66° C. (150° F.) and 127° C. (260° F.) and the first period of time is between 2 minutes and 30 minutes. Also preferably, the second pressure and elevated temperature for a second period of time are, respectively, between 30 and 150 psig and between 121° C. (250° F.) and 204° C. (400° F.), between 1 minute and 30 minutes. Preferably the product is a fertilizer.

Another embodiment of the invention is directed to fertilizer manufactured by the methods of the invention. Preferably, fertilizers of the invention have both fast and slow nitrogen release profiles so that a percentage of available nitrogen is released to the soil within 0 to 14 days upon application of the fertilizer, preferably from 10 percent to 70 percent, and a second, slower release representing about 30 percent to 90 percent of the available nitrogen content of the fertilizer releases into the soil over a period of 2 weeks to 4 months following application. Preferably, nitrogen release is timed to match the needs of the growing crops or plants.

Other embodiments and advantages of the invention are set forth in part in the description, which follows, and in part, may be obvious from this description, or may be learned from the practice of the invention.

DESCRIPTION OF THE FIGURES

FIG. 4. Physical and chemical characteristics of organically modified ammonium sulfate fertilizer of one embodiment of the invention.

DESCRIPTION OF THE INVENTION

Figure 1A:
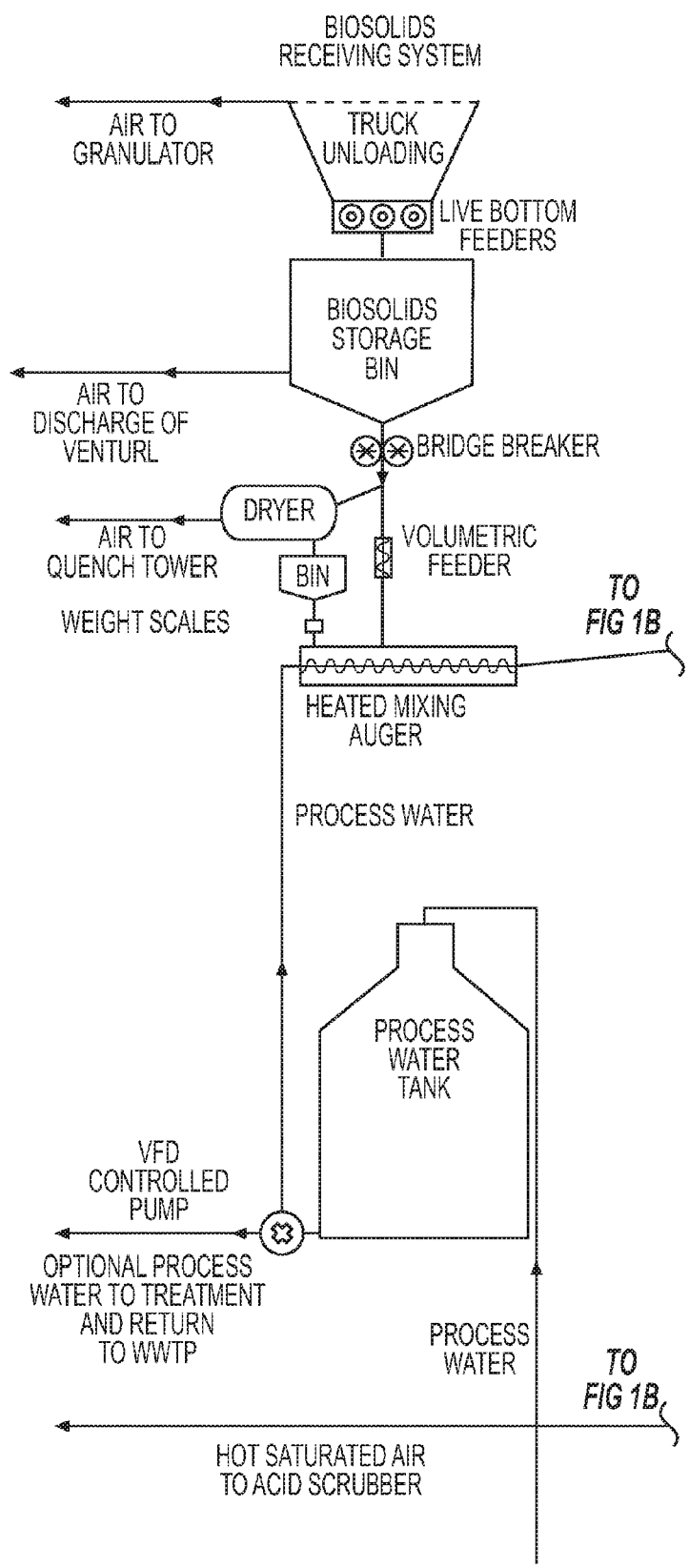
FIGS. 1A-C. Fertilizer Plant Flow Chart of one embodiment of the Invention illustrated from: unloading of municipal organics (FIG. 1A); to the reactor (FIG. 1B); and to drying (FIG. 1C).

All countries and population regions around the world create waste in the form of organic materials. The phrase organic material includes, but is not limited to biosolids such as organic biosolids, biosolids containing microorganisms, municipal biosolids and heat-dried biosolids, and also includes pharmaceutical and laboratory processing and fermentation wastes, farm and agricultural wastes, decayed and digested organic materials, harvested plant and plant-like materials such as algae including blue/green algae, bacteria including blue/green bacteria, cyanobacteria (e.g., blue/green, rust, black), mold and fungi, humates, humic acids and fulvic acids, industrial wastes and their by-products, microbial, chemical and enzymatic digests of organic products, plant and animal foods, food stuffs, and byproducts, animal manures, digested and processed animal manures, recycled fertilizers, and all combinations thereof. Disposal of organic waste materials pose a major problem as well as expense to all communities. Traditional disposal methods involve burial, burial at sea or incineration. Each of these options compounds the problem by creating untenable amounts of pollution that foul the community as well as the planet. New techniques have been developed that involve heat treatment to inactivate microorganisms and other potentially contaminants that can result in a product that can be as a low value fertilizer. Although these techniques are ecologically sound, they have not caught on because, in large part, the product is of such low value that there is little to no commercial incentive for communities to switch from the traditional bury and burn philosophy, and no funds that allow for the creation of safe processing facilities.

It has been surprisingly discovered that high-value fertilizers with specific and predetermined release profiles of one or more nutrients can be efficiently manufactured from organic materials, including but not limited to raw and semi-processed organic materials such as biosolids, agricultural materials and industrial wastes. Such fertilizers can be specifically tailored to crops so that the release profile of the fertilizer matches the needs that arise during the growth and development of the particular crop. In addition, the process of the invention destroys not only all potentially harmful microorganisms, but hydrolyzes many polymers including forms of biopolymers (e.g., DNA, proteins, carbohydrates, toxins, antibiotics, hormones, etc.), forms of composite materials, and even forms of plastics. The resulting fertilizer product is of high value and also contains the hydrolyzed monomers (e.g. amino acids, sugars, etc.) that are beneficial and desirable for a fertilizer.

The process of the invention allows for the production of fertilizers with pre-selected release profiles that can be tailored for specific crops. It was unexpectedly discovered that the nutrient content of the organic material selected is not determinative of the release profile. In other words, a fertilizer that consists mostly of algae as the organic matter, which is relatively high in nitrogen, will not have nitrogen release profile that's significantly different from a fertilizer made from organic material with a low nitrogen content. What was discovered in that the release profile is determined by the electrostatic state or condition of the organic material (see FIG. 5). Organic material that has a greater ability to bind and hold, for example ferrous iron, when processed according to the invention will have a specific release profile for ferrous iron. Similarly, organic material that has a greater ability to bind and hold, for example nitrogen, when processed according to the invention will have a specific release profile for nitrogen. In other words, the amount and type of organic materials can be manipulated in processing according to the invention to pre-determine the release profile of the fertilizer. Thus, fertilizers can be created with nutrient release profiles that closely or exactly match the nutrient needs of the particular plant or crop. The availability of specific nutrients can determine one or more growth characteristics of a plant. For example, making a certain nutrient or combination of nutrients more or less available to a plant during various aspects of a growth cycle can shift growth to more or less seeds, to more or less flowers, to larger or smaller leaves, fruits or overall biomass, or various combinations thereof. The growth characteristics of various plants are well known to those of ordinary skill in the art, and the fertilizer can be matched to the particular grown characteristics desired.

In addition, it also was surprisingly discovered that the release profile of the organic material can be altered by the combination of different organic materials and/or the addition of one or more agents that create and/or reduce that electrostatic state of the organic material. Various such agents include, for example, anionic and cationic chemicals, chelating agents (e.g., EDTA, EGTA), ionic sequestering agents, metal ions, citric acid, amino acids (e.g., glutamic acid, histidine, lysine, glycine), peptides, proteins, sugars, saccharides and polysaccharides, iron, sulfur, phosphorous and nitrogen-binding compounds, and other chemical and chemical compounds well known to those of ordinary skill in the art. The rate, amount and/or type of fertilizer component released includes, but is not limited to the components of nitrogen, phosphorous, potassium, sulfur, iron, organics and combinations thereof. The electrostatic state of large collections of different organic matter was surprisingly consistent, although difference may exist between types. The electrostatic state of organic materials is known or easily determined by those of ordinary skill Nevertheless, procedures for determining the electrostatic state of a particular organic material or collection can be determined using commercially available equipment by those of ordinary skill in the art. As discussed herein, those difference can be utilized by the methods of the invention.

Thus, fertilizers can be manufactured for all or parts of a growing season for any particular crop. With a nutrient release profile that matches the entire growing season of a specific crop, fertilizer of the invention only needs to be applied once. If nutrient requirements change over one growing season, two or more fertilizers of the invention can be applied at the appropriate times during growth and development of the crop. As the nutrient requirements of agricultural crops are very well known, one of ordinary skill in the art need only preselect, according to the invention, desired nutrient release profiles into the fertilizer.

The present invention allows for the generation of an ecologically and financially circular economy. This occurs ecologically when organics in the terms of food from the farm are consumed by society, organic wastes are created and successfully incorporated into a high nutrient fertilizer and returned to the farm to benefit soil health. This is accomplished financially when manufacture the fertilizer causes funds to be paid to the community businesses for the chemical inputs to create the said fertilizer. Once the fertilizer is manufactured it is sold back to community farms to create the soil nutrient environment necessary for optimum crop production.

Figure 3:
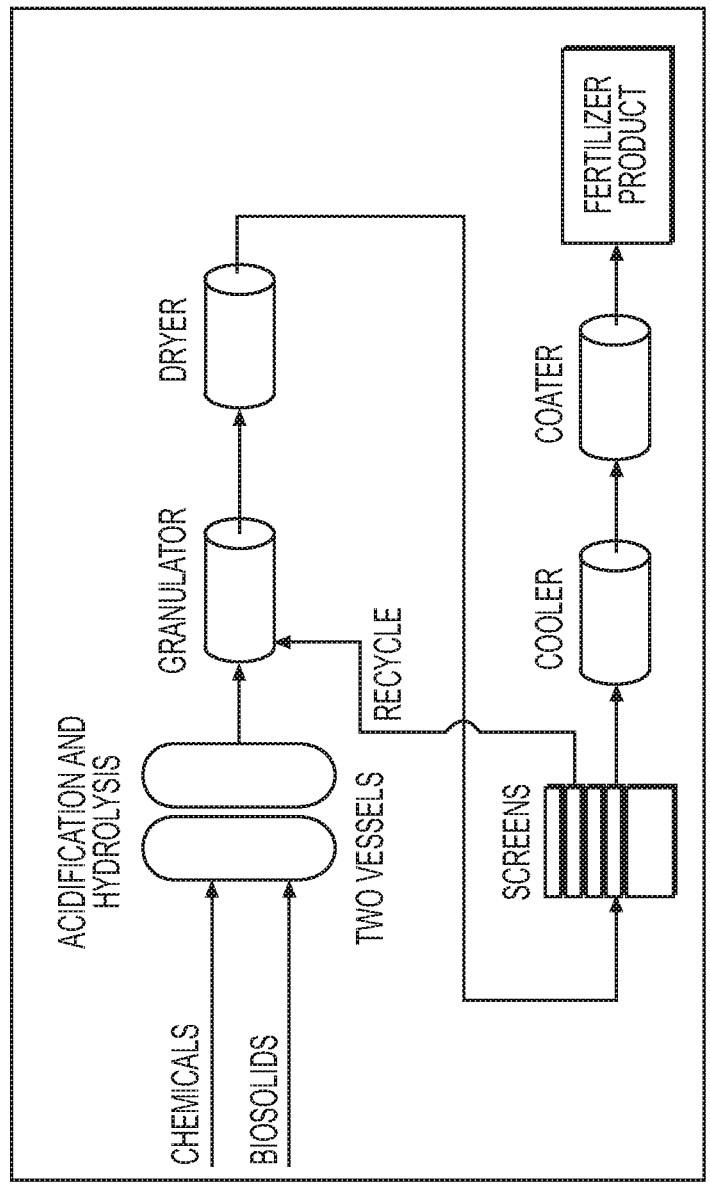
FIG. 3. Schematic of a modified Ammonium Sulfate Process of one embodiment of the invention.

One embodiment of the invention is directed to methods for the manufacture of a fertilizer with a predetermined release profile of one or more nutrients. The release profile may comprise the amount, rate and/or differential level of release of one or more of the nutrients of the fertilizer. A schematic of the general process of the invention is depicted by FIG. 3. The method comprises providing an organic material which may contain biosolids or another organic material to which, optionally, is added an odor control agent, that itself can be utilized as an important plant nutrient in the final fertilizer product, to reduce or eliminate odors that may be present from the organic material or other components of the starting materials. The organic material and/or mixture optionally may be heated. Heating is often needed in environments where the climate temperature is below 10° C. such as below 4° C. The resulting mixture, which may contain added water recycled from other steps of the method, is preferably thoroughly mixed. To this mixed material is added an acid that reacts exothermically with the organic material and the water that it is suspended in resulting in increases in both temperature and pressure (when mixture is contained in a pressure tight reaction vessel). The temperature increase desired may be determined by the amount and concentration of the particular acid selected and/or period of incubation. During this time, preferably two to ten minutes, the components are mostly or entirely liquefied. One of ordinary skill in the art can determine the time necessary for mixing and the mixing intensity with more vigorous mixing for a short time, or less vigorous for longer times. To the heated liquefied material, which is transferred, preferably under pressure, to a second pressure vessel, is added ammonia, which is preferably also liquefied or vaporized and also under pressure, and the subsequent reaction with the acid component of the mixture serves to further increase temperature and pressure. The ammoniated and liquefied biosolids are maintained for a short period of time under these conditions, preferably two to ten minutes, and then processed, preferably into granules of fertilizer. This embodiment may also be accomplished, less efficiently, but sufficient to form a fertilizer melt, if the acidified mix is transferred to a second vessel which is maintained at ambient pressure conditions during addition of the ammonia.

The ammoniation reaction may be carried out to completion whereby all or nearly all of the acid is reacted such that the result is a fluid with a viscosity of less than 1200 cP in the form of a fertilizer melt. The combination of acid and ammonia creates a salt melt (a partially ammoniated mix) (e.g. with sulfuric acid the salt produced is ammonium sulfate) which retains fluidity to permit dispersing, such as for example spraying, into a granulator that may contain recycled fertilizer material. Preferably, upon ammoniation salt to melt ratios are about 20/80, about 25/75, about 30/70, about 35/65, about 40/60, about 45/55, about 50/50, about 55/45, about 60/40, about 65/35, about 70/30, about 75/25, and about 80/20. The purpose of these ratios is to maintain melt fluidity. If the neutralization by the ammonia is carried to completion a complete salt is formed and fluidity may be insufficient to transfer the mixture to a granulator for shaping and forming granules. Salt formation may be determined and in real time by the measurement of the pH of the mixture. Preferred pH values of the melt are between 2.0 and 4.0. It is preferable to partially ammoniate the acid mixture in the reactor (thereby forming a melt) and complete the ammoniation in a second vessel (e.g., pugmill) or in the granulation process as in a granulator.

An advantage of this invention is that, because the organic materials are liquefied, the liquid can be more easily transported as needed through pipes preferably using pressure differentials as compared with any solid, semisolid or thixotropic material. The liquefied organic materials can also be more evenly applied to acceptor material in the granulator thereby permitting the formation of a more evenly formed spherically-shaped granule. Although spherical shapes are preferred commercially, any shape of granule can be created by one of ordinary skill in the art using commercially available equipment. Organic materials are preferably entirely liquefied, although mostly liquefied is typically sufficient. Preferably the liquid exhibits a characteristic readiness to flow, little or no tendency to disperse, and relatively high incompressibility.

Viscosity of the starting organic material is typically in excess of 100,000 cP and typically 150,000 cP at ambient temperature and does not change significantly even at elevated temperatures typical in a processing facility. For comparative purposes, at about room temperatures, molasses has a viscosity of about 5,000 to 10,000 cP, honey has a viscosity of about 2,000 to 10,000 cP, chocolate syrup has a viscosity of about 900 to 1,150 cP, and olive oil has a viscosity of about 81 cP. With the addition of acid and heat according to invention, viscosity of the organic material decreases to a range of from about 500 to 5,000 cP, and preferably to less than 4,000 cP, more preferably to less than 3,000 cP, more preferably to less than 2,000 cP, and more preferably to less than 1,000 cP. With the addition of ammonia and the added temperature increase from the resulting exothermic reaction, viscosity increases to a range of 500 to 4,000 cP, and preferably to 2,000 cP or less, more preferably to 1,500 cP or less. Also, problems typically associate with solid debris that is normally present in organic material such as wastewater biosolids, with debris such as plastic and hair, are eliminated as all such material is hydrolyzed resulting in a decreased viscosity as well.

The low viscosity material of the invention facilitates fertilizer manufacturing by permitting the establishment of control related to temperature, pressure and time of reaction. The fluidity is advantageous so problems and inefficiencies commonly associated with solid debris clogging or otherwise blocking transport from one vessel to another and thereby requiring shutting down the system for maintenance are eliminated. No solids or semi-solids are present that would otherwise increase wear and tear on equipment and thus, shorten equipment life. Further, organic solid materials including, for example, plastic and hair, well known to cause blockages in conventional processing, are completely broken down and hydrolyzed to their monomer components. The acid reaction hydrolyzes many polymers that may be present such as proteins and other materials including plastics, hair, and biologically active compounds (whether naturally present or artificially created), and breaks down and destroys many and nearly all and preferably all macromolecules and microorganisms that may be present. The acid and subsequent ammonia environment creates a sterile fluid melt. This increases the safety to process workers and further simplifies and increases the efficiency of any cleaning or maintenance of the system that may be required periodically. This hydrolysis further increases the safety in the use of the resultant fertilizer product in comparison to other traditional organics-containing fertilizer products such as those made in biosolids alkaline-stabilization or composting or traditional Class B land application processes. The fertilizer produced is sterile thereby meeting the most stringent of the USEPA Class and EQ microbial standards.

Another advantage of the invention is that, because the process can be easily contained, the need for dust and odor control apparatus within the manufacturing plant is minimized. The processing steps are closed and under negative pressure and no steps are performed in open or areas exposed to the environment or the environment of the facility. Odor control agents are preferably added initially, but could optionally as easily be added at any step in the process. The key to this invention is that the physical chemical conditions created in the described embodiments eliminate noxious odors from the resultant fertilizer. Alternatively, or in addition to other odor control processing, the granules may be exposed to ozone during formation and/or cooling. Ozone will substantially reduce or eliminate disagreeable odors of the fertilizer. The manufacturing plant has a robust process odor control treatment such that no noxious odors from reduced sulfur compounds, amines, or other organics-related odorants are present at the manufacturing fence line. Thus the invention is a major improvement as compared to conventional fertilizer manufacturing practices in which a large manufacturing facility is located as far away from communities as possible thereby requiring that input materials be shipped over long distances to operate the plant. A good example of this odor problem was the biosolids conversion-to-fertilizer plant located in Helena, Ark. which practiced the manufacturing processes taught in U.S. Pat. Nos. 5,984,992; 6,159,263; 6,758,879; and 7,128,880, and utilized biosolids that were transported all the way from New York City. This AR plant did not have the odor control system necessary to eliminate noxious odors from being released to the environment.

Another advantage of the invention is that, because acid and ammonia are added in a controlled manner, the final components of the fertilizer can be predetermined. The exact amount of nitrogen in the final product can be regulated based on the amount of the starting materials including the biosolids, acid, base, water, and any other components. Similarly, the exact amount of sulfur, iron, phosphate, potassium and even organic matter can also be regulated or, if desired, eliminated from the final product producing a custom-made fertilizer product. Many crops that require fertilization are grown in areas known to be high in phosphate, sulfur, potassium or other elements. Fertilizing with conventional fertilizers, although needed, typically exacerbates the contamination. Fertilizers produced by the methods of the present invention would not only overcome such problems, but could be tailored for use in conjunction with a specific type of soil or specific need of a select type of crop. In addition, the process of the invention allows for supplementation of the fertilizer during processing with additional ingredients.

Another advantage of the invention is that it is easily performed in large scale, with continuous processing and under automation. No significant retention times are required, thus no delays, so that processing continues from start to finish without interruption as can be required when material is required to incubate for days as is common for some types of conventional biosolids processing as in composting or alkaline stabilization processes. The process of the invention is scalable to any amount of organic material. This is highly preferred at least because most municipal regions vary in size and thus, the amounts of organics such as biosolids produced per day vary widely. Also, amounts are expected to also vary over time. Further, each step of the process can be performed under complete automation including accounting for necessary variation per day and over time.

Another advantage of the invention is that it allows for co-location of the facilities for processing organic materials such as biosolids with the municipal wastewater treatment plants. Biosolids can be then taken directly from wastewater treatment plants to processing thereby minimizing transport and potential spillage of potentially harmful compounds. Another preferred embodiment is to locate close enough to the wastewater treatment plant to be connected by a screw or belt conveyor or a biosolids pumping system. Alternatively, another preferred embodiment is to locate adjacent to the wastewater plant. The goal of the present invention is to place the processing plant as close to the wastewater plant as possible. Thus the present invention eliminates most of the cost of transportation by locating the physical equipment necessary to perform the manufacturing process adjacent or close to the source of the biosolids such as municipal wastewater treatment plants. Manufacturing plants of the invention preferably allow for adjacent storage facilities. Again, by being adjacent, transportation logistics are simplified or eliminated thereby reducing transportation costs of the product as well as the transportation costs of input organics such as biosolids. Also, the processes of the invention have the advantage that they may be interfaced with other production facilities. Those facilities may be associated with an unrelated commercial enterprise. Further and more commonly, co-locating near a commercial enterprise that creates excess heat, as in a furnace, or kiln, would advantageously permit the use of this excess heat by the present invention as in the replacement of the need for fossil fuels such as natural gas or by the co-generation of electricity by utilization of said excess heat.

Another advantage of the invention is that because the process minimizes the amount of water and power (e.g. electrical) needed, and amount of waste byproducts formed, as compared to conventional processing, manufacturing can be sized to service the needs of the size of the particular community in which the plant is located. This tailoring design allows for a biosolids processing/fertilizer manufacturing plant that can process smaller amounts of biosolids (e.g., less than 3 tons per hour of dewatered biosolids) or scaled up for larger plants (e.g., up to 20 tons per hour or more). In a preferred embodiment the optimal size is between 10 and 12 tons per hour, which allows for local operations and does not require long distance transportation of raw materials.

Types of community organics that may be utilized in this invention include municipal biosolids, domestic septage, farm and agricultural wastes, animal manures, digested and processed animal manures, recycled biosolid fertilizers, organic biosolids, biosolids containing microorganisms, and heat-dried biosolids. Other organic materials that can be processed according to the method of the invention include, but are not limited to pharmaceutical and laboratory processing and fermentation wastes, organic industrial wastes, microbial materials, decayed and digested organic materials, humate and humic acids and fulvic acids, farm and agricultural wastes, harvested plant materials such as algae including blue/green algae, seaweed and other aquatic plants and water-borne organic detritus, bacteria including blue/green bacteria and cyanobacteria (e.g., blue/green, rust, black), slime, insects and insect biomass (e.g., body parts, manure), mold and fungi, industrial wastes and their by-products, microbial, chemical and enzymatic digests of organic products, foods, food stuffs and food byproducts, and combinations thereof. In addition to conventional biosolids, most all organic materials can be processed by the methods of the invention including spoiled or otherwise rotted food stuffs such as, but not limited to vegetables, meats, fish, and agricultural products as well as plastics, and carbon-containing household trash and recyclables.

Another advantage of the invention is that organic materials, and even in combination with certain non-organic materials, that are otherwise difficult to dispose can be processed according to the invention as a method of turning into a useful product what would otherwise be waste material occupying space in a landfill or the ocean. By way of non-limiting example, algae is skimmed from the surface or otherwise collected from eutrophic bodies of water for aesthetic purposes as well as for the general health of the plants and animals that habitat the environment. Often algae may be contaminated with natural toxins or toxic compounds absorbed or metabolized and concentrated within the algae from the environment. By processing the algae according to the methods of the invention, the algae can be converted to fertilizer and, importantly, the toxins destroyed or otherwise inactivated. In addition, algae or other plants or bacteria may be intentionally grown and harvested to be processed according to the invention.

The organic material is preferably dewatered or hydrated to a solids content of between 10 and 40 percent, more preferably between 15 and 30 percent, and more preferably between 20 and 25 percent. The optimal solids content of a particular organic material can also be empirically or experimentally determined. Organic material received for processing according to the invention will typically have lower solids content than the optimal level. Preferably, the organic material of insufficient solids content can be adjusted to the desired concentration through blending/mixing with 'dry' organic materials with a solids concentration of 70 to 95 percent and preferably 85 to 92 percent. The 'dry' organic materials may be available through third party sources or may be produced with the available organic material through heat drying. Heat drying processes include heated screw conveyors, disc dryers, rotary dryers, paddle mixer/dryers, fluid bed dryers and other commercially available processes/equipment. The dried organic materials and the organic material of insufficient solids concentration will be mixed in a mixing vessel to reach the ideal solids content as determined empirically or experimentally. The mixing vessel may be a pugmill, a mixing screw conveyor, a multi-shaft mixer, a ribbon paddle blender, a high shear mixer, a static mixer or other commercial high viscosity slurry mixer. Less preferably, the organic material of insufficient solids content can be adjusted to the desired concentration by heating the material to remove water as necessary to attain the desired concentration. This can also be done in the same heat drying equipment listed above. Organic materials received for processing may need hydration and, when necessary, additional water is preferably added from water collected during other steps of processing. This use of recycled water further adds to both the efficiency and beneficial economics of the invention.

If necessary during the intake processing, the organic material can be conditioned by injection of steam, water, and/or heat (e.g. made thixotropic) and/or subjected to violent agitation and physical disruption to enable or enhance flow or movement. In these initial steps, the organic material can be blended with chemical additives such as oxidizing agents or iron containing compounds, for the initial odor control and to prepare the biosolids for reaction in the pressure vessel. For example, biosolids may be infused with black or agricultural grad phosphoric acid to minimize odors. In this example, the phosphoric acid added here will alter the final concentration of phosphate in the fertilizer product. The amount of phosphate added to the product in this step can be as little as 0.5 percent and as much as 16 percent. In addition to odor minimization, the phosphoric acid adds a valuable nutrient component to the product fertilizer.

Preferably the odor control agent is added to the initial organic material to be processed, although one or more odor control agents can be added at any time during processing including during granule formation and cooling. Preferred odor control agents include, but are not limited to calcium ferrate, sodium ferrate, potassium ferrate, ferrous sulfate heptahydrate, rozenite, melanterite, ferric chloride, ferrous sulfate, ferrous sulfate monohydrate, hydrogen peroxide, and/or ozone as well as various other salts, derivatives and combinations thereof. The amount and type of odor control agent can be determined empirically by one of ordinary skill in the art, but typical amounts range from 0.01 percent by weight of the mix or of the granules, to up to 6 percent of the mix or granules, and is preferably about 0.05%, 0.1%, 0.25%, 0.5%, 0.75%, 1.0%, 1.5%, or 2.0%.

The organic material, odor control agent and possibly recycle water are delivered to a mixing vessel where they are thoroughly mixed and may form a thixotropic paste that is pumped or easily transported. The mixing vessel may be a pug mill, a mixing screw conveyor, a multi-shaft mixer, a ribbon paddle blender, a static mixer, a high shear mixer or other commercial high viscosity slurry mixer. Pug-mills, blenders and mixers are mixing chambers having blade-shaped blending elements mounted on a powerfully driven shaft or shafts that rotate at a variable but controlled speed which divide, mix, back-mix and re-divide the materials to be blended multiple times a second to yield a thorough, uniform blend with reliable consistency.

Alternatively, the mixing vessel to reach solids concentration and the mixing vessel for the conditioning with recycle water, phosphoric acid, odor control agents or other additives may be combined in a single mixer of adequate size to give desired mixing energy and time.

To the mixture is added acid, in the preferred embodiment at the inlet of the first pressure vessel, creating an exothermic reaction, which thereby causes additional heating. As pressure is optional, the term pressure vessel does not imply that increased (or decreased) pressure is required, only that a suitable vessel is to be utilized. The acid is added to the mixture by direct injection into a pressure vessel or injection at the vessel inlet. In the pressure vessel the mixture is agitated or otherwise continuously mixed. The acid is at a very low pH and preferably in the range of pH negative 4.0 to pH positive 1.0. As is known to those skilled in the art, with very strong aqueous acids there are too few water molecules to disassociate the acid completely. As a consequence, the true pH is much lower than an actual measurement. A negative pH indicates that the pH calculation would be a negative log of the molarity where the molarity of hydrogen ions is greater than 1. Preferred pH values for acids utilized are, for example, pH of 2.0 or less, pH of 1.0 or less, pH of 0.8 or less, pH of negative 1.0 or less, pH of negative 2.0 or less. Preferred acids include, but are not limited to hydrochloric acid, boric acid, hypochlorous acid, perchloric acid, carbonic acid, phosphoric acid, sulfuric acid, nitric acid, hydrofluoric acid, carboxylic acid, and derivatives, mixtures, and combinations thereof. The amount and type of acid added is determined by one of ordinary skill in the art from the amount of organic materials being treated and/or the desired result, which includes but is not limited to one or more of, achieving a predetermined temperature or pressure or liquefying the mixture. In part because the organic materials are liquefied, there is little to no build up of calcium silicate, insoluble phosphate compounds or other insoluble compounds in pipes, a typical problem with conventional biosolids processing facilities. Addition of the acid causes an exothermic reaction that heats and increases the pressure of the container (when in a pressure tight reaction vessel). This pressure which upon commencement of the reaction is at ambient may in fact be maintained at ambient or a desired pressure throughout the acidification process by monitored or controlled venting. Alternatively, the pressure may be allowed to increase with increasing temperature due to the exothermic heat of hydration reaction. Such pressures may reach an upper range of 40 psig by controlling venting or in the absence of venting. In addition, acidification can be performed under negative pressure. Preferred negative pressure ranges are from one atmosphere (atm) (14.7 psi) to 0.9 atm, to 0.8 atm, to 0.7 atm, to 0.5 atm, to 0.4 atm, to 0.3 atm to 0.2 atm, and to 0.1 atm or less.

Temperature of the mixture increases, preferably to or above 38° C. (100° F.), to or above 43° C. (110° F.), to or above 49° C. (120° F.), to or above 54° C. (130° F.), to or above 60° C. (140° F.), or to or above 66° C. (150° F.), such as for example to or above 82° C. (180° F.) or 93° C. (200° F.), and more preferably to or above 104° C. (220° F.), 110° C. (230° F.), 116° C. (240° F.), 121° C. (250° F.). This acidification may be carried out without pressure in the reactor by permitting release of vessel air during acidification, however in the preferred embodiment to facilitate the transfer of the acidified mix into the second vessel the pressure in the first or acidification vessel will be maintained above the pressure achieved the second vessel. The acidification process is carried out for a retention time of between 2 minutes and 30 minutes with a preferred time of between 4 minutes and 8 minutes. In an alternative embodiment, all pre-acidification ingredients including the organic material, odor control agent, phosphoric acid and possible recycled water, may be mixed in the acid reaction vessel either before or simultaneously with the acidification.

After reaction of the acid at the desired time, temperature and pressure, the acidified mixture is discharged from the acid pressure vessel and transferred to a second pressure vessel. At the second pressure vessel, ammonia is injected to the mixture either at the second pressure vessel inlet or directly into the second pressure vessel. The amount and form of ammonia added is determined by one of ordinary skill in the art from the amount of acidified mixture or organic materials being treated and the desired result, which includes but is not limited to one or more of, achieving a predetermined temperature or pressure or liquefying the mixture. The addition of ammonia increases the temperature of the mixture liberating steam which increases the headspace pressure within the second pressure vessel. Pressures can again be regulated with pressure relief valves or by controlling the discharge of melt from the ammoniation vessel. Subsequent addition of the ammonia base, preferably in a second pressure vessel, further affects the temperature of the mix, preferably raising the temperature to at or above 121° C. (250° F.) such as 138° C. (280° F.) or 143° C. (290° F.), more preferably to at or above 149° C. (300° F.), more preferably to at or above 154° C. (310° F.), 160° C. (320° F.), 166° C. (330° F.) or 171° C. (340° F.), and more preferably to at or above 177° C. (350° F.) such as for example to at or above 182° C. (360° F.), 188° C. (370° F.), 191° C. (375° F.), 193° C. (380° F.), 199° C. (390° F.), 204° C. (400° F.) 210° C. (410° F.), 216° C. (420° F.), 221° C. (430° F.), 227° C. (440° F.) or 232° C. (450° F.). Preferably heating is performed for a retention period of time that is equivalent to the time required to achieve the desired temperature and allow completion of reactions. Preferred periods of reaction time, which may include exothermic heating time, are between 1 and 30 minutes, more preferably between 3 and 15 minutes, more preferably between 5 and 10 minutes, or any combinations of these ranges. Also, reacting times may also be dependent on the constituents and/or makeup of mixture being reacted and/or the amount and/or type of acid added. Reactions take place in closed container vessels, and pressure in the headspace of the container vessel increases as well. Pressures can again be regulated with pressure relief valves and are preferably maintained between 5 psig and 150 psig, more preferably between 30 psig and 100 psig, and more preferably between 40 and 80 psig. Preferred pressures include, but are not limited to 5, 10, 20, 30, 40, 50, 60, 70, 75, 80, 90, 100, 110, 120, 125, 130, 140, 150 psig.

The processes of the present invention with biosolids and others forms of organic materials produce a fertilizer that is preferably safe to handle and work with and preferably meets and/or exceeds the minimum requirements of a USEPA Class A and EQ biosolids. Fertilizer product is preferably sterilized and biological and chemical contaminants are at least partially and preferably completely hydrolyzed and biological agents are denatured to the point of inactivation and/or destruction. Typical biological or chemical contaminants include, but are not limited to one or more of pharmaceutical compounds, antibiotics, hormones, hormone-like molecules, biologically active compounds, macromolecules, carbohydrates, lipids, proteins, nucleic acids, and combinations thereof.

The present invention preferably includes a stress conditioning over a predetermined retention period that creates stress conditions that meet or exceed those associated with traditional autoclaving of materials. This autoclave effect destroys and/or inactivates or simply sterilizes the organic material. Microorganisms in the organic material, including for example, bacteria, viruses, fungi, parasites, parasite eggs, bacterial and fungal spores and combinations thereof, are destroyed and/or inactivated. In addition, the processes of the invention are preferably designed to hydrolyze macromolecules such as proteins, nucleic acids, lipids, fats, carbohydrates and combinations thereof, and/or other biologically-active substances that may be present. The majority of microbial cells are physically broken down during this processing with the resultant organic compounds contributing to the organic material or matrix of the fertilizer.

At any time during the steps of the method, one or more hardening agents can be added to the mixture. Preferred hardening agents include, but are not limited to ferric oxides, alum attapulgite clay, industrial molasses, lignin, ligno sulfonate, urea formaldehyde polymerizer and combinations thereof.

At the desired time, which may be determined empirically or experimentally, the liquid is processed into fertilizer. Preferably processing involves transfer to a granulator for removal of water and formation of dried fertilizer granules. Preferred is processing in a granulator which contains 60-88 percent by weight old granules, and drying the granules preferably with heat to greater than 90 percent solids, and preferably 98 or 99 percent solids or greater. Preferably, water extracted from the granules is collected with a portion recycled in the steps of the process and the remainder treated for discharge. Granules are typically quite hot during the drying process and, optionally, may be allowed to cool by transfer to a cooling room or cooling apparatus. During cooling, ozone may be injected into the cooler as an odor control measure. Preferred amounts of ozone to be injected are from 0.01% to 5% of the weight of the cooling granules, more preferably from 0.1% to 2% and more preferably from about 0.5% to 1%. Preferably, ozone is introduced to the cooling apparatus by sparging.

Once dried and formed and optionally after cooling, the granules are sized and preferred are granule size of 0.5 mm to 4 mm. More preferred are standard fertilizer granules of about 2.8 mm and specialty "mini" granules of about 1 mm.

One or more commercially available hardening agents can be added to the granulator. Preferred hardening agents include, but are not limited to ligno-sulfonate, lignin, molasses, or a combination thereof. Granules of greater than 4 mm and less than 0.5 mm are recycled in the granulator. Granules of the desired size are further processed by coating with one or more commercially available dust control agents. Preferably, granules greater than 4 mm are crushed and mixed with the granules of less than 0.5 mm, and all is recycled in the granulator.

The invention preferably provides for both dust and odor control systems to ensure community acceptance of the manufacturing plant as well as making the process more efficient through the capture and incorporation of valuable nitrogen or other potential and/or fugitive plant nutrients from the processed air of the plant.

Another embodiment of the invention is the fertilizer manufactured by the methods of the invention. The physical and chemical characteristics of organically modified ammonium sulfate fertilizer of one preferred embodiment of the invention are listed in FIG. 4. Fertilizer from organic materials such as biosolids may be powdered or in pellets, or is preferably in the form of granules that are of a predetermined size and are resistant to crushing. Further, preferred granules are generally spherical having a smooth exterior with few pits or crevices and circular or oval in shape. Preferably, the fertilizer contains no or negligible detectable un-hydrolyzed polymers and preferably the polymers within the organic mixture have been hydrolyzed including, but not limited to plastics, pharmaceutical compounds, antibiotics, hormones, hormone-like molecules, biologically active compounds, macromolecules, carbohydrates, nucleic acids, fats, lipids, proteins, and microorganisms. Hydrolyzed polymers form monomers of the polymer that accumulate in the product and are preferably multiple chain length polypeptides and amino acids.

The process of the invention preferably results in the production of granules or pellets of USEPA Class A and or EQ fertilizer product of suitable dryness, hardness, and chemical quality to produce a valuable, high-nitrogen, slow-release (e.g. enhanced efficiency, controlled release, dual release, predetermined release) commercial fertilizer product that is capable of competing in the national and international marketplace against traditional inorganic fertilizers. Preferably, the fertilizer product has a controlled and preferably slow-release of nutrients to the soil, wherein control can be exercised by adding different types and amounts of organic material during manufacture. For example, a product in which the different nutrients are converted to a slow-release form due to sequestration of the ions by the organic matter in the fertilizer, including nitrogen, phosphorus, potassium, sulfur and various micronutrients selected from the group comprised of iron, manganese, magnesium, copper, calcium, selenium, boron and zinc (see FIG. 5).

Significantly this invention instructs that the degree of slow-release nutrients contained in the fertilizer may be adjusted on demand as in a "dial-up" or controlled ability for degree of slow-release or enhanced efficiency. In the preferred embodiment the slow-release nutrient, such as nitrogen, may constitute 10% to 80% of the nutrient concentration by dry weight contained in said fertilizer. More preferably the slow-release nutrient component is 30% to 70% of the said fertilizer. The degree of slow-release of the product can be adjusted by changing the amount of added organic materials such as wastewater plant biosolids, digested food stuffs, other microbially digested materials such as pharmaceutical fermentation waste, digested food waste; extracted liquid organic fraction from municipal solid waste; animal residuals; digested animal residuals and algae harvested from eutrophic surface water sources, and or humates, humic acids, fulvic acids or, iron humates containing fulvic and humic acids. Additionally, the amount of slow-release nutrient can by directly changed by adding specific stabilizing chemicals such as Nutrisphere-N (commercially available from Verdesian Life Sciences), a proprietary nitrogen binding agent used in agriculture to reduce volatilization and leaching and or other inorganic compounds that react with ammonia to create slowly soluble forms that are then slow-release nutrient compounds in the fertilizer. Additional nutrient-binding agents, such as nitrogen (ammonium ion) binding can be added to the process, preferably at the second mixer or granulator and include, for example, amino acids such as lysine, polypeptides containing nutrient-binding amino acids, and magnesium ammonium phosphate. The addition of such agents directly changes the percentage of nutrient ions that are slow-release. This ability to change the percent of nutrients that are slow release also directly increases the commercial value of said fertilizer as the conversion of nutrients to a slow-release form provides better crop production due to these nutrients being available over more of the growth cycle.

Figure 5:
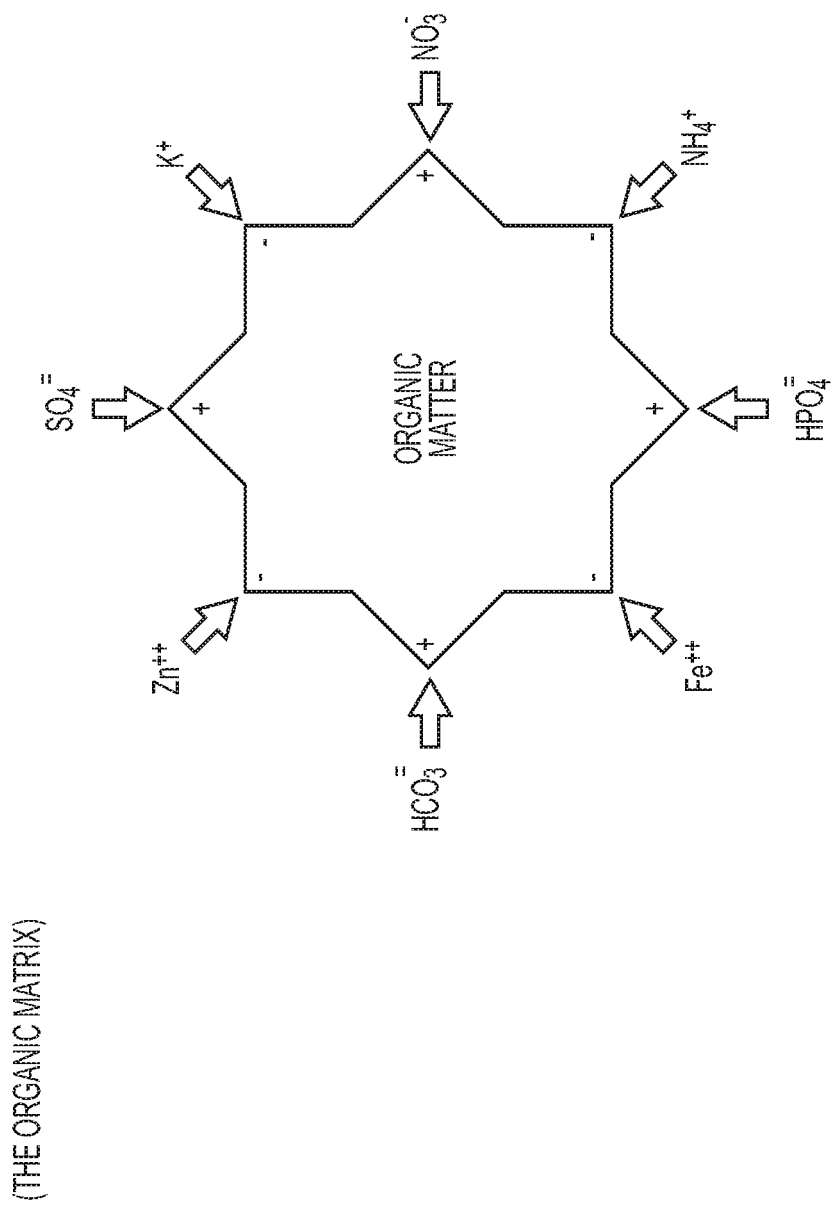
FIG. 5. The organic matrix provided by the invention showing a variation of binding abilities.

FIG. 5 illustrates the electrostatic binding of the inorganic nutrients such as the positively charged ammonium ion, the negatively charged sulfate ion and the positively charged ferrous ion to the corresponding opposite charges located on the organic molecules such as variably length polypeptides and monomeric amino acids thereby creating the organic matrix entity. This organic matrix serves as a mechanism of delivering a slow-release or enhanced efficiency release of the nutrients into the soil column over the growth period for the target crops. This slow-release of nutrients is facilitated by the action of soil microbes.

Figure 7:
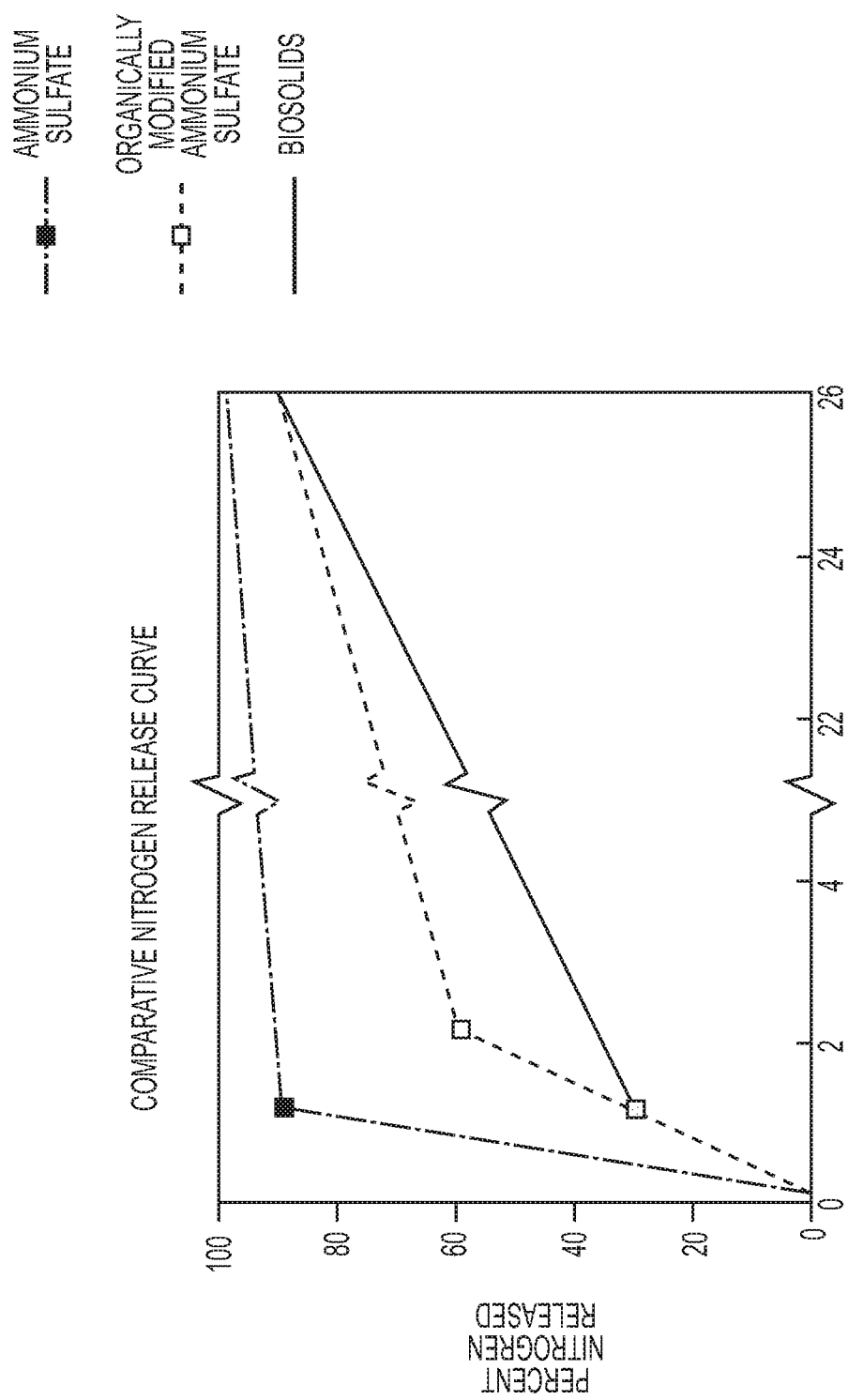
FIG. 7. Academic nitrogen release curve of plants fertilized with ammonium sulfate, organically-modified ammonium sulfate of the invention, and biosolids showing percent nitrogen released into soil over number of weeks.

Slow-release or dual release fertilizers of the invention allow for a single application of fertilizer that provides a rapid first release (e.g. bolus) of nitrogen to growing or emerging plants such as commercial crops (e.g., fruits, vegetables, grains, grasses, trees), then a continued amount preferably over an entire or part of a growing season (e.g., see FIG. 7). This minimizes the number of fertilizer applications needed per crop which provides substantially savings in application expenses.

Figure 1B:
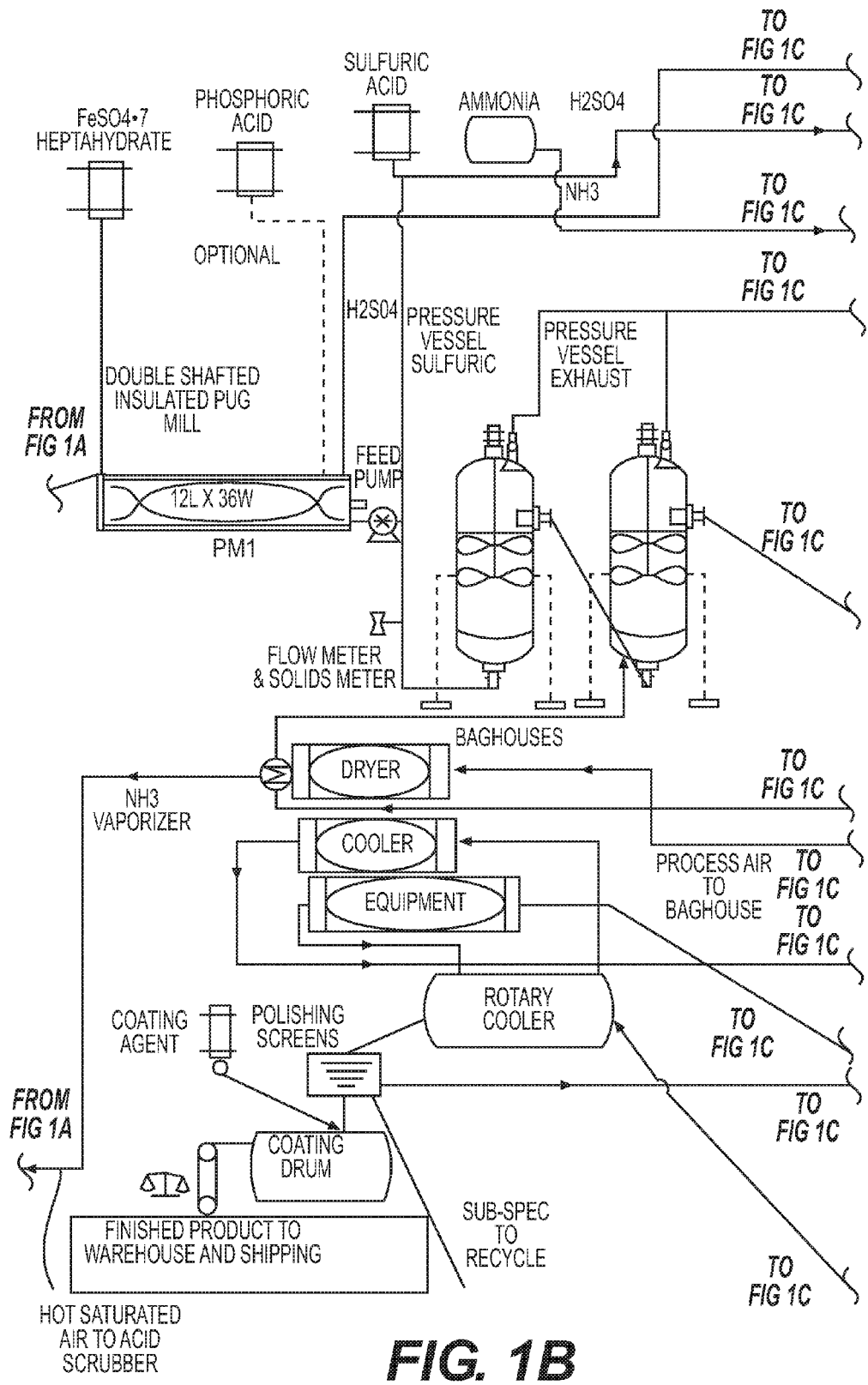
Figure 1C:
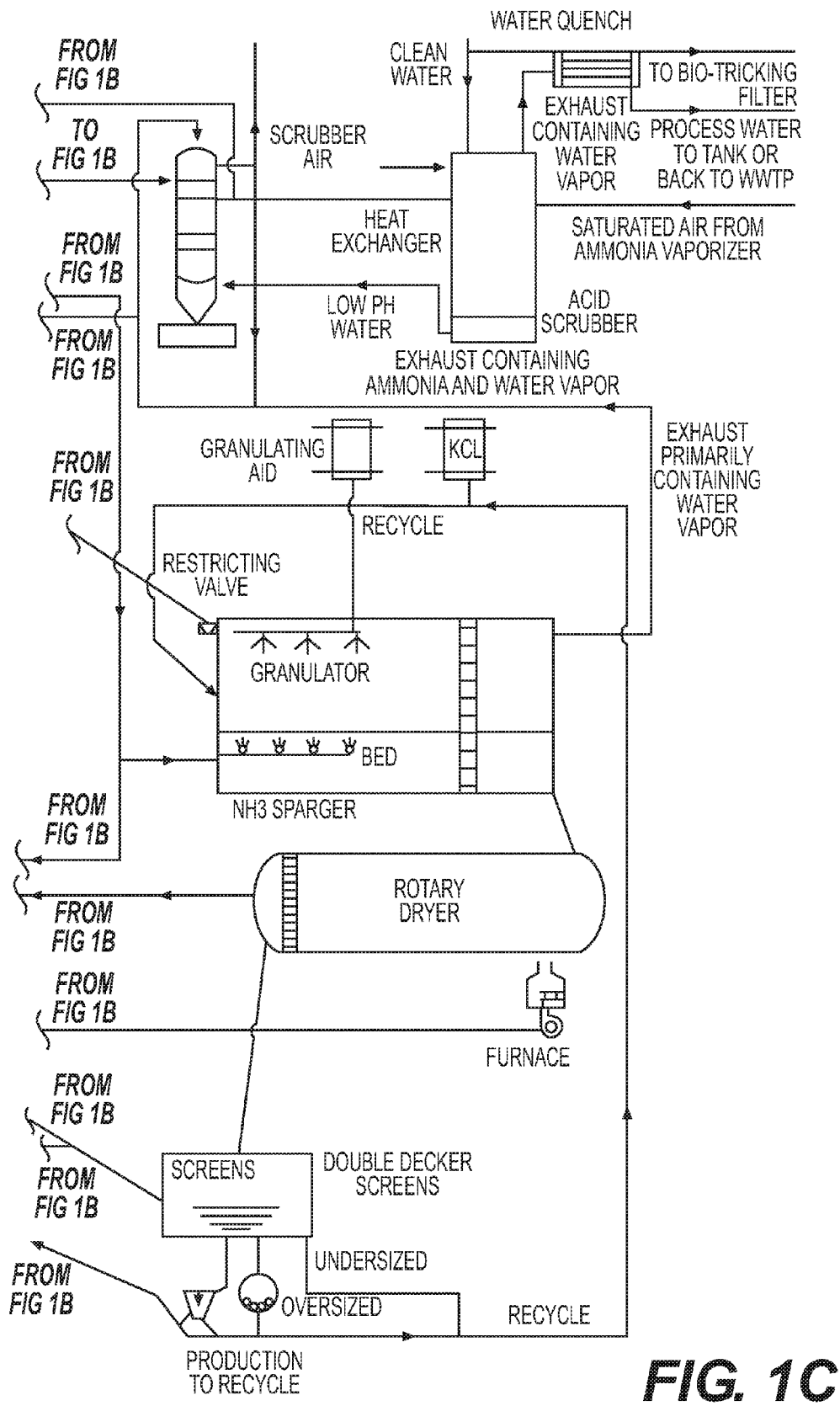
Figure 2A:
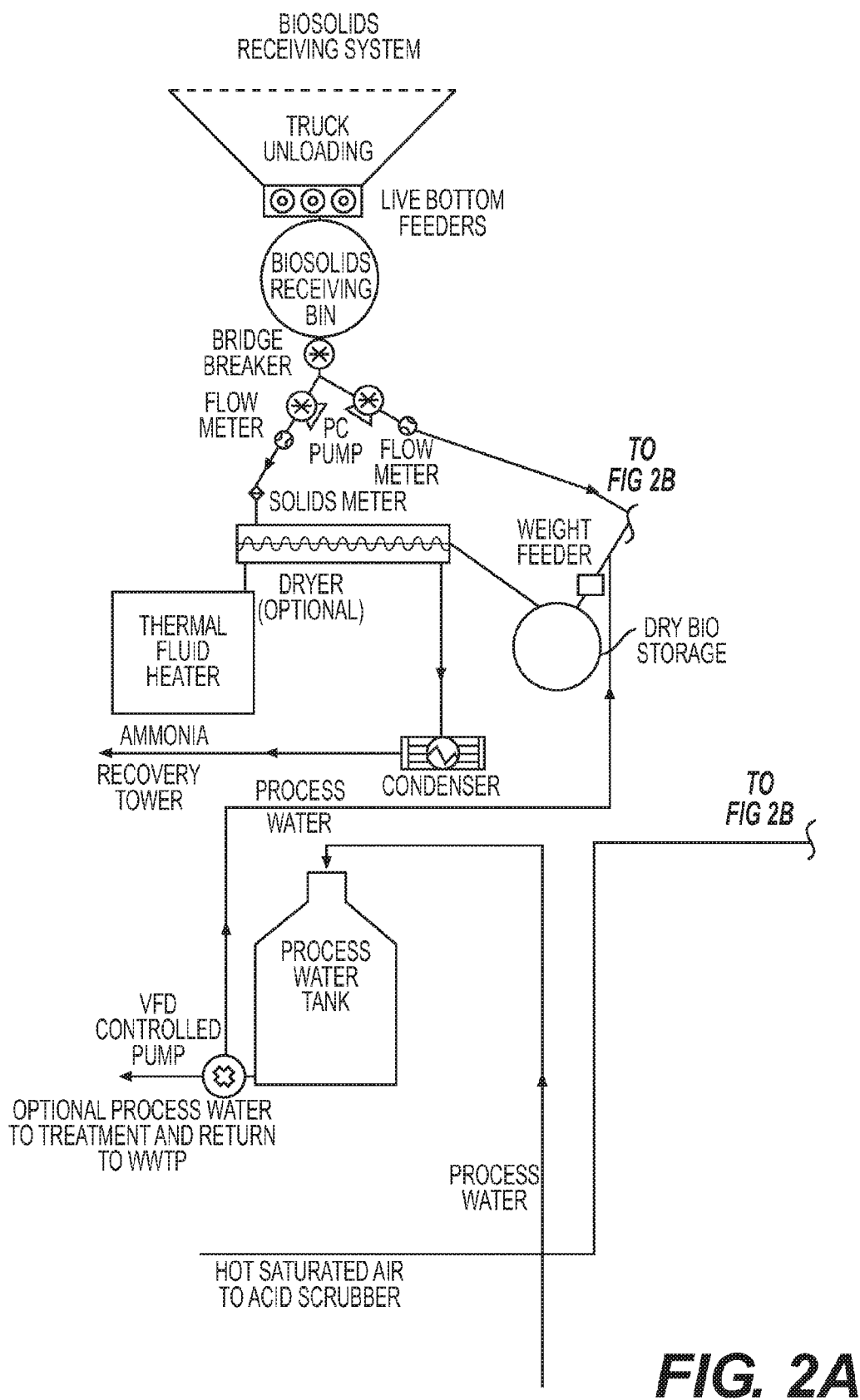
FIGS. 2A-C. Fertilizer Plant Flow Chart of another embodiment of the Invention illustrated from: unloading of municipal organics (FIG. 2A); to the reactor (FIG. 2B); and to drying (FIG. 2C).
Figure 2B:
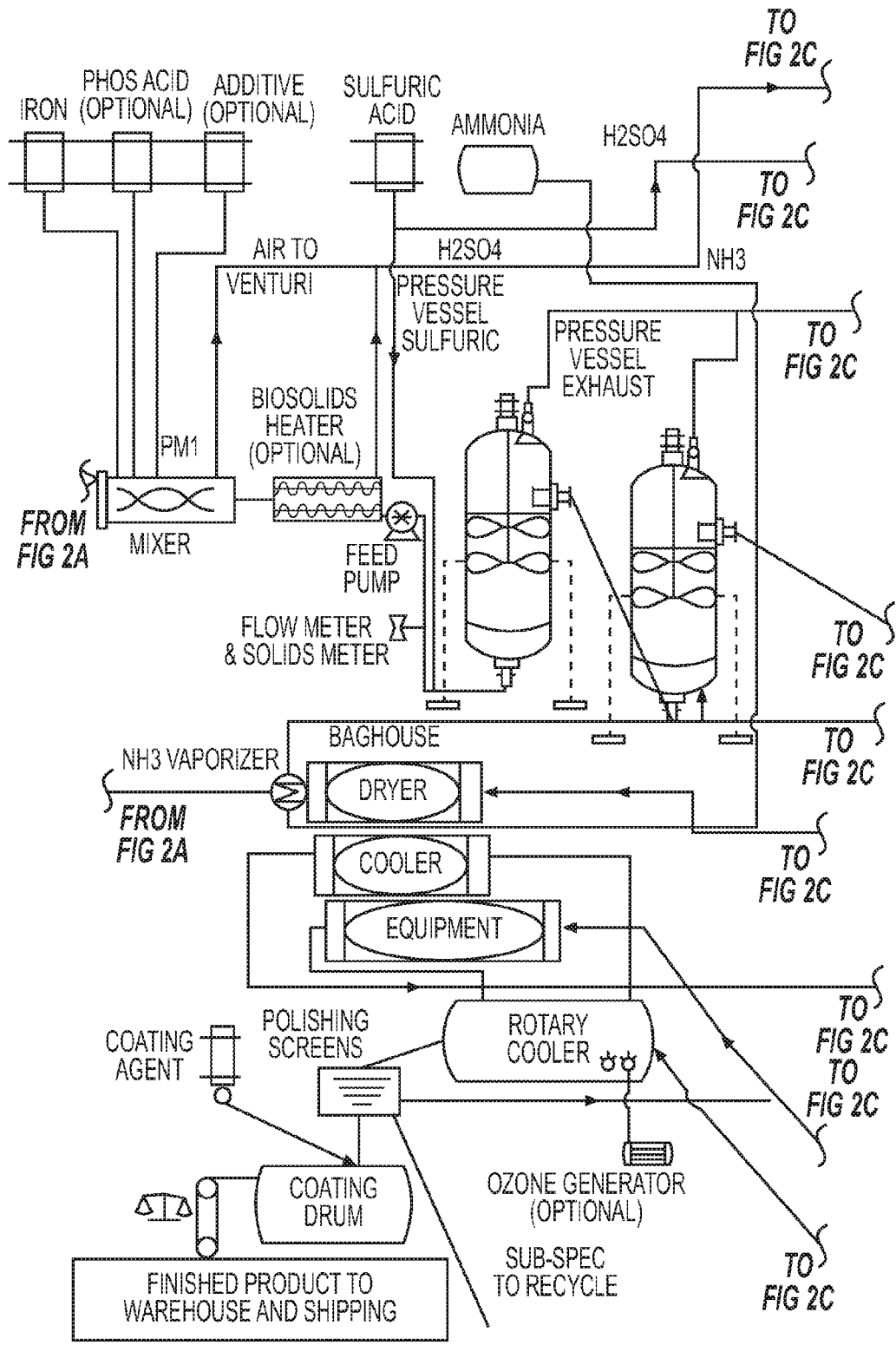
Figure 2C:
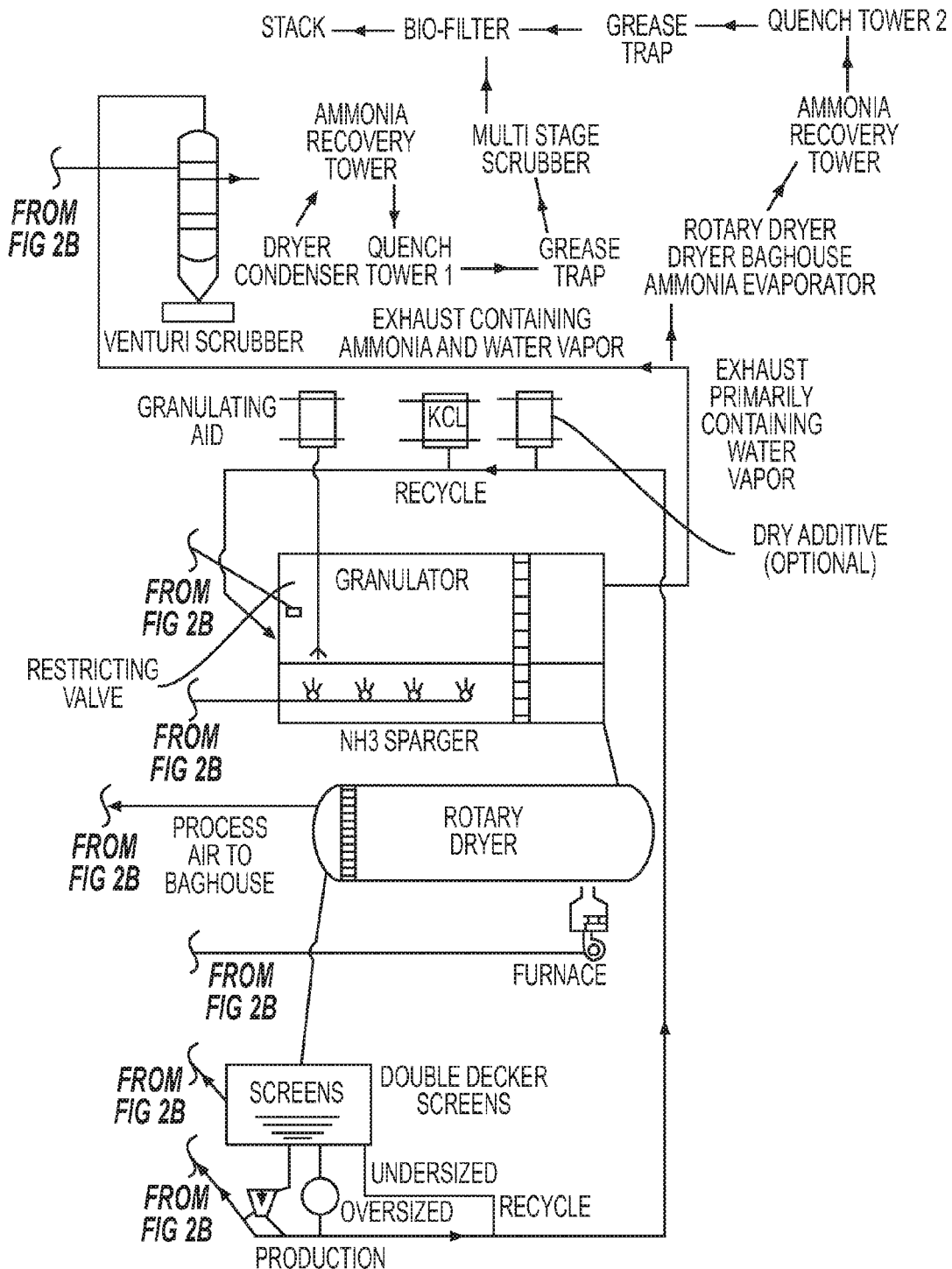

Stress resistant ammonia binders such as municipal organics can be added in the mixer prior to the first hydrolysis and/or acidification vessel. Compounds that are more heat or pressure sensitive can be added directly to the granulator such as is shown in FIGS. 1A, 1B and 1C. Nutrients are sequestered or chelated by organic molecules of the product in which said inorganic nutrients are released to the soil environment by microorganism metabolism over time after fertilizer application. Organics are comprised of macromolecules obtained from microorganisms broken down during product processing including: denatured proteins; peptides and amino acids; nucleic acids, cytokinin-like compounds, lipids and carbohydrates as well as hydrolyzed and denatured organics from the community organics defined in this invention. The organics form a matrix within the fertilizer which is comprised of a complex of variable chain length amphoterically charged organic molecules which attract and electrostatically bind both positive and negatively charged inorganic nutrient molecules such as ammonium ion and sulfate ions. The product provides ammonium-N which can be utilized by plants before they develop a nitrate-N reduction system and is as a result very energy efficient. Ammonium-N($NH_4^+$) in fertilizer of the invention requires less of the plants' stored metabolic energy for incorporation into plant components. In this invention it has been demonstrated that the conversion from the ammonium ion to the nitrate ion is retarded thereby beneficiating the target plants. Plants can use both ammonium and nitrate N, but ammonium-N is a more energy efficient form of N for plants and is less leachable. That means that more sugars formed by photosynthesis can be stored in grain or fruit as starch resulting in increased yield. It has been estimated that utilizing ammonium nitrogen can save 10-17% of photosynthetic energy which plants have stored.

Figure 8:
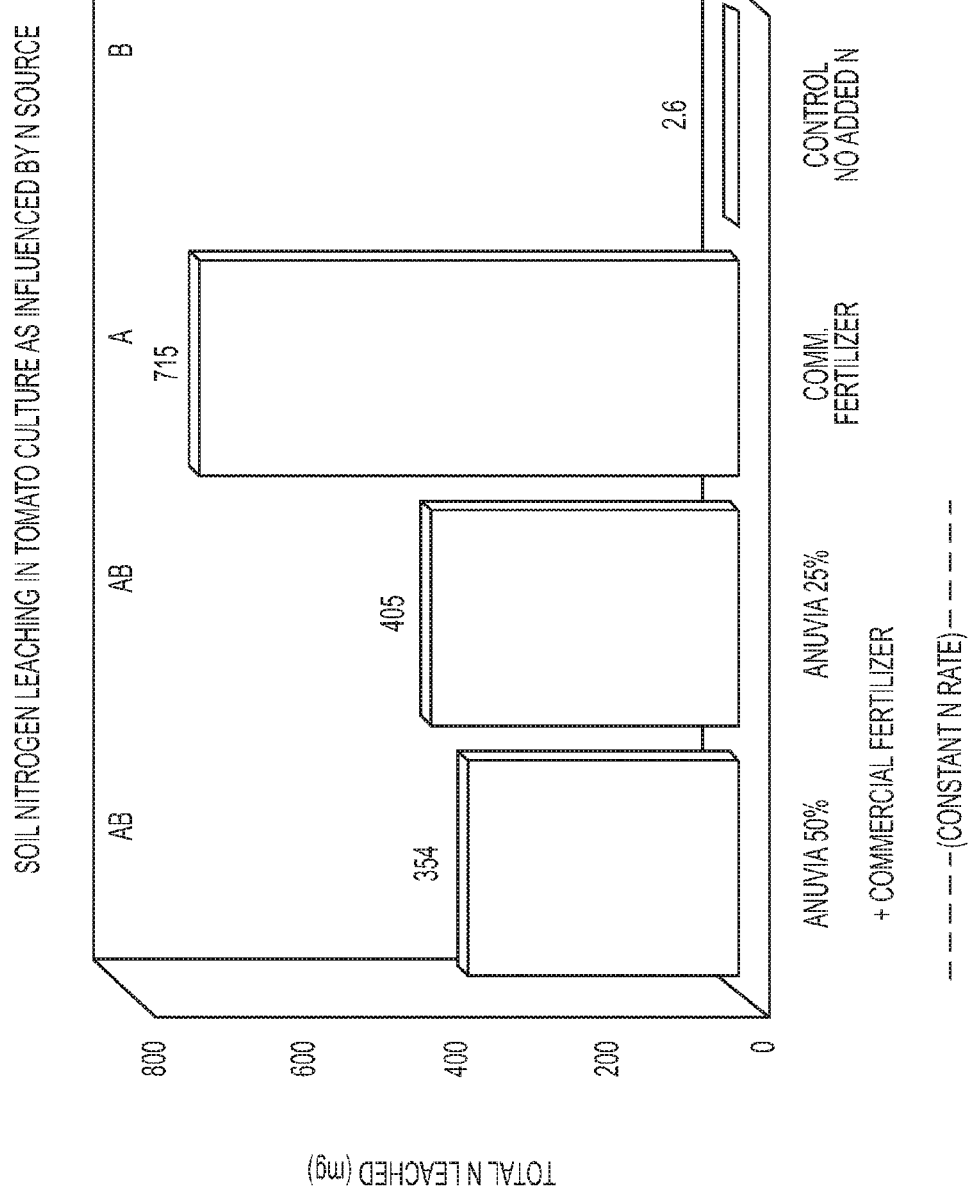
FIG. 8. Soil nitrogen leaching in tomato culture as influenced by nitrogen source.

Preferred fertilizer products are ones from which nitrogen uptake as the ammonium ion reduces the possibility of nitrogen losses by leaching and denitrification by soil bacteria. Such losses can be sizeable from nitrogen fertilizers that do not contain ammonium or are rapidly converted to nitrate-N. Multi-nutrient fertilizers are preferably homogeneous and contain several essential nutrients. FIG. 8 illustrates soil nitrogen leaching in tomato cultures as influenced by nitrogen source.

A useful range of nutrient concentrations for plant development includes, for example, nitrogen 8 to 18%; phosphorus 0 to 10%; potassium 0 to 10%; sulfur 5 to 20%; iron 0 to 5% and organics 4% to 18%. Preferably, the product of the invention does not lose an amount of its contained nitrogen (N) greater than 3% as ammonia to the atmospheric environment upon surface application to a dry soil and not more than 30% as ammonia from a flooded soil. Preferably, product manufactured according to the invention has an amount of zinc sulfate or soluble forms of boron added as plant nutrients. Sequestration improves plant iron use efficiency by retaining the added iron primarily in the plant-available ferrous ion form. Preferably the product delivers sulfur in the plant-available form as the sulfate ion. The organic content contributes to the soil carbon pool which improves soil quality. Product of the invention has an organic nutrient complex that facilitates ion exchange uptake by the root hairs of the target crop, improves the micro-ecology in the root zone and soil tilth, and increases target plant stress resistance to heat and drought. Preferred product is non-hydroscopic with a granule hardness of between 4 and 9 pounds, more desirably between 6 and 8 pounds, with a bulk density of between 52 and 56 pounds/cubic foot optimizing its blendability with other agricultural fertilizers. Preferably, selected herbicides and pesticides may be introduced to the granule surface area or mixed within granules of the product. The fertilizer is preferably uniformly black in color. However, fertilizer of the invention can be manufactured in any color which can be useful to assess distribution patterns and marketing advantages.

A commercial, high-nitrogen fertilizer preferably has greater than 8 percent nitrogen by dry weight of the finished fertilizer and more preferably at least 15 percent nitrogen by dry weight of the finished fertilizer. The Class A characteristic refers to the microbiological quality of the finished fertilizer product, which meets the United States Environmental Protection Agency Class A microbiological standards for a product containing municipal biosolids as defined in 40 C.F.R. §503. Also, fertilizer of the present invention meets or exceeds this standard on the basis of the stress conditions, the retention time, and processing conditions utilized thus ensuring that the three conditions associated with USEPA Exceptional Quality (EQ) standards are met. These include the Class A standard as above, the metals concentration level in the product as defined in CFR 503 and the Vector Attraction Standards are met (90 percent solids or greater in the finished product), that the finished fertilizer granule is optimized for minimal water content increasing the hardness characteristic and eliminating water with respect to product optimization of the finished fertilizer. The percent solids of the finished product are preferably greater than 92 percent solids, more preferably greater than 97 percent solids, and more preferably greater than 98 percent solids.

Biosolids treated according to the processes of the invention typically contain low levels of metals such as arsenic, cadmium, copper, lead, mercury, molybdenum, nickel, selenium and/or zinc. Low levels are levels below what are considered harmful and less than the Exceptional Quality ("EQ") standard for metals as published by the USEPA for products containing municipal biosolids. Thus, by exceeding the USEPA regulation and the conditions of the hydrolyzer or pressure vessel for macromolecules (e.g., personal pharmaceutical products such as antibiotics or hormones or hormone-like substances), the resulting fertilizer is safe for use in agriculture and horticulture (plants and animals) and is exceptionally safe for handling by workers during processing, handling, distribution, sales and agricultural application.

As the fertilizer product produced contains both biosolids and a high-content of desirable nitrogen, a preferred embodiment results in a variety of specific nutrient analysis fertilizers of which the following are typical: 16-1-0-18-3-15 or 16-1-2-17-3-14 (Nitrogen-Phosphorus-Potassium-Sulfur-Iron-Organics). The slow or controlled enhanced efficiency release granular fertilizer is at least 98 percent dry and exceeds the United States Environmental Protection Agency (USEPA) Class A requirements and Exceptional Quality (EQ) Standards. Thirty percent of the total product N is slow release organic nitrogen (16% N×30%=4.8% slow release N) which is bound to components of the biosolids. Slow release ammonium N is slowly converted to leachable nitrate by soil bacteria land does not volatilize to the atmosphere as ammonia. The result is higher nitrogen use efficiency by plants and less environmental impact of the product nitrogen.

The fertilizer product may be tailored to a desirable content of elemental components. Preferably the fertilizer has a nitrogen content of between 6 and 20 percent, more preferably from 8 to 18 percent, a phosphate content of between 0 and 10 percent, more preferably from none to 5 percent, a potassium content of between 0 and 5 percent, more preferably from one to four percent, a sulfur content of between 10 and 30 percent, more preferably from 15 to 20 percent, an iron content of between 0 and 8 percent, more preferably from one to four percent, and an organic content of between 5 and 30 percent, more preferably from 10 to 20 percent (or any combinations of these ranges).

The fertilizer product contains nitrogen in the form of ammonium ions non-covalently bound to organic and other chemical compounds of the fertilizer. Unlike ammonium sulfate fertilizer, the bound ammonium ions are not all immediately released into the soil upon application. Instead, there is a first release over a period of two weeks after application of an amount of nitrogen to the soil that represents from about 30-65% of the available nitrogen of the fertilizer. This fast release typically ranges over a period of one to three weeks, slower than a conventional ammonium sulfate fertilizer that typically releases 90% or more of its available nitrogen to the soil in about 5 to 10 days, but faster than the nitrogen release of the 2% to 6% nitrogen in conventional biosolids fertilizers. Over the subsequent days and weeks, the bulk of the remaining nitrogen (for example, 35%) of the fertilizers of the invention gradually releases into the soil. Sun, heat, water and/or microbes in the soil act on the fertilizer and slowly break down the ionic bonds releasing available nitrogen to the roots of the plant. Preferably, the nitrogen release is from about 1% to 5% per week, and more preferably from about 2% to 4% per week. A small amount of nitrogen may be covalently bound to compounds of the fertilizer, and thereby is further dependent upon microbial catalysis of the organic molecule for release to the soil and plants. Preferably this amount of unavailable nitrogen is 5% or less, more preferably 2% or less, and more preferably 1% or less of all nitrogen of the fertilizer product. This dual nitrogen-release profile is advantageous to turf and agricultural use and not characteristic of conventional commercial fertilizers.

Another embodiment of the invention is directed to a process for manufacture of a fertilizer with a predetermined content of one or more of nitrogen, phosphate and/or potassium. Processing of organic materials proceeds as described herein wherein the acid selected is of the type and amount desired in the final fertilizer product. For example, using a set amount of phosphoric acid will result in a set amount of phosphate in the final fertilizer product. By using a particular amount of sulfuric acid, a particular amount of sulfur will be retained in the fertilizer. By selecting the type and amount of acid, one can pre-select the content of the fertilizer product produced. Preferably, the fertilizer is supplemented with one or more plant nutrients added during one or more steps of the processing. The one or more plant nutrients include, but are not limited to urea, ammonium nitrate, ammonium sulfate, monoammonium phosphate, diammonium phosphate, urea ammonium nitrate, liquid urea, potash, iron oxide, soluble iron, chelated iron, micronutrients like magnesium, manganese, copper, zinc, molybdenum or boron, and combinations thereof.

Another embodiment of the invention is directed to a system for the manufacture of a fertilizer. The invention comprises a mixer that blends the organic component containing biosolids, optionally with an odor control agent. The mixture is then transferred to a first pressure vessel. The pressure vessel is preferably of a construction that allows for a vigorous mixing with continuous exothermic reaction with the aqueous phase of the conditioned organics paste and a direct hydrolysis of the organic compounds in the material. An agitator/mixer is incorporated into the first pressure vessel. Optional heating elements that may be external to or internal within the vessel may also be incorporated into the pressure vessel. Acid may be blended directly with the organics in the first pressure vessel or, preferably, the acid and heated biosolids are combined in a mixing tee and together added to the pressure vessel. Within the pressure vessel heat and pressure buildup is continued for a period of time to form a liquid from the paste-like organics mix. The liquid mix may be further treated in the same pressure vessel, or preferably transferred to a second pressure vessel through a pipe or conduit. The mix is preferably transferred in a turbulent flow so as to prevent or minimize the possibility of organic material remaining in the conduit. Also preferably, the acidified liquid mix is combined in a mixing tee with the ammonia from an ammonia source, preferably vaporized ammonia, and together forcibly injected to the second pressure vessel. Preferably the liquid mix is forced through the conduit by the pressure built up by the heating reaction in the first vessel or by a pressure that is added to the system behind the liquid mixture to ensure that all of the liquid mix has been transferred to the second vessel. Preferably the gas, which may be air or another gaseous compound or mixture, is purged, if necessary, by way of a relief valve in the second vessel. Within the second pressure vessel, the acidified and nitrogen-fortified liquid mix exothermically heats due to the acid/base reactions and/or is heated to a second predetermined temperature and pressurized to a second predetermined pressure for a second period of time. Preferably the ammonia source is liquefied and/or vaporized ammonia under pressure. Also preferred, is a system whereby the first and second pressure vessels each contain an agitator or other mechanism that continually mixes the mixture. Alternatively, the first and second pressure vessels may be the same with the acid and the ammonia added sequentially. Following ammoniation, the mixture is transferred to a pugmill or granulator wherein the steam and water vapor is released and the ammoniated liquid is mixed with preformed granules (commonly referred to as "recycle" to form or shape the new fertilizer granules. These granules are then heated in a rotary dryer or fluidized bed dryer to form dried granules of the fertilizer. In a preferred embodiment, the entire reaction process is controlled by a closed loop computer control that continuously monitors and adjusts the exothermic reaction through addition of sulfuric acid, ammonia, plant nutrients, pH adjusters and pressure control. The preferred control mechanism is through adjustment of the head space pressure above the biosolids in this pressure vessel and by valve control of the exit volume. The system also preferably contains a conveyer (e.g. pump or screw conveyer, conveyer belt) for transporting organic materials to the mixer and another pump for transporting the blended organics to the first pressure vessel; a pressurized piping system that transports acidified organics from the first pressure vessel to the second pressure vessel, ammonia into the second pressure vessel; and disperses the ammoniated liquid melt to the granulator. Thus, the entire process is carried out without the need for stopping the continuous flow of biosolids into and out of the pressure vessels.

From the granulator, or incorporated with it, is preferably a rotary dryer or alternatively a fluidized bed dryer that further dries the biosolids fertilizer to less than 2 percent water content. Upon exiting the dryer the biosolids fertilizer is further screened for size and separated into product, undersize and oversize granule groups. The undersized particles are recycled back into the entrance of the granulator. The oversized particles are sent to a hammer mill where they are crushed and then recycled to the granulator. After leaving the screening process the biosolids fertilizer granules are processed through the rotary cooler where the organic-containing fertilizer is cooled. Optionally, the cooler may include an ozone generator that provides ozone to the cooling fertilizer. In the presence of ozone, odor-causing material complexes with oxygen and possible other molecules present in the biosolids and substantially reduces or eliminates disagreeable odors. The fertilizer granules empty into the final polishing screens to remove undersize granules or dust created in the cooling process. After processing through the polishing screens, the product passes through a coating drum where a coating agent that inhibits dusting is added. The biosolids fertilizer is then warehoused ready for bulk shipping or subsequent packaging. Alternatively, granules may be subject to an air polishing system that continuously recycles the hot air generated in the cooling process to the drying stage resulting in a reduction in fuel usage and waste air for processing. The air drawn from the screens and equipment is cleaned in a dust collector, cooled through a heat exchanger and reused as inlet air to the cooler. The heated air discharging from the cooler is again cleaned in a dust collector. The cleaned, heated air is used as inlet air for the rotary dryer. The system also preferably contains one or more screens for selecting granules of a predetermined size and a rotary cooler for cooling and polishing the sized granules. The system of the invention preferably comprising a dust control apparatus such as, for example, vacuums and baghouses that collect dust from the granulator and also a water recovery system whereby water extracted from biosolids during processing is recovered and recycled rendering the system very efficient.

In a preferred embodiment, process air is acid scrubbed to remove any fugitive odorants and especially vaporized or gaseous ammonia. The captured ammonia, as an ammonium salt, is mixed back into the biosolids mix prior to its entering the reaction vessel or mixer thereby increasing the efficiency of the entire system and maximizing the final nitrogen concentration in the finished fertilizer. Miscellaneous residuals including dust, non-specification or reclaimed product and dried fertilizer that is too small or undersized or oversize material that is crushed in a crushing or mill apparatus or may include other additives, e.g., iron that a customer would prefer can be added to the composition of the finished fertilizer are added to an optional pug-mill or mixer positioned downstream from the pressure vessel or directly into the granulator. During the granulation process, a hardener or hardeners which help to agglomerate the mix and contribute to the hardness of the dried pellet or granule are added at the second pug-mill or granulator. The hardener or hardeners are selected from the group comprised of attapulgite clay, lignin, industrial molasses, lignosulfonate, and alum among others or mixtures of these hardeners as known by one skilled in the art.

Optionally, dependent upon the requirements of the customer, additional plant nutrients, for example, potash or other forms of potassium, e.g., potassium hydroxide or potassium sulfate, are preferably added at the pug mill or granulator to directly affect the nutrient formulation of the fertilizer. Additional solid nutrients that may be added also comprise urea, thiosulfate, ammonium nitrate, urea ammonium nitrate (UAN), 10-34-0 liquid fertilizer, mono-ammonium phosphate, diammonium phosphate, zinc chloride, liquid ammonia, and/or potash. Also added in this second pug-mill or granulator is any additional iron required. The iron contributes an important and valuable plant nutrient to the fertilizer mix, serves as a granulation aid and as described in the invention earlier serves to reduce noxious odors associated with the use of the community organic materials.

Also, additional ammonia may be sparged into the pug-mill and into the granulator directly to complete the formation of the ammonium salt and to control the pH of the mix and to facilitate the formation of the finished granule. The solids used to adjust the pH may also be principally alkaline agents selected from the group comprised of calcium carbonate, sodium hydroxide, potassium hydroxide, calcium oxide, cement kiln dust, lime kiln dust, Class C fly ash, Class F fly ash, multistage burner ash, alum, alum biosolids from water treatment and wood ash. These are added via screw conveyors at specific rates for each compound. The liquid additions also include pH adjustment materials such as acids, e.g., phosphoric acid or sulfuric acid, or caustic solutions, e.g., ammonium hydroxide, sodium hydroxide or potassium hydroxide. These are pumped at respective rates to the injection ring to enter the pug-mill.

The fertilizer product of the present invention preferably has a pH of between 4.5 and 7.5, more preferably between pH 5.0 and pH 7.0, and more preferably between pH 5.5 and pH 6.9. The remainder of the processing for shaping as in pellet or granule production includes standard fertilizer granulation technology especially for high volume throughput plants. The pellet or granule product, especially in smaller throughput plants considered to be those of less than 25 tons product production per day, may involve more innovative technologies such as injection or extrusion followed by milling or spherulizing the pellet or granule or involves simple discharge from a granulator or granulating pug-mill. When a granulator or granulating pug-mill is used, it is preferable to feed some recycle, as in dry seed material, i.e., dry fines and fines produced by the crusher or mill or sub-specification or reclaim material of the fertilizer product, into the pug-mill and the granulator to adjust the percent moisture present in the mix so that agglomeration or nucleation can occur resulting in granule formation.

Other preferred embodiments comprise adjustments to the processes disclosed herein. Embodiments incorporate a pelletizer in place of the granulator in the process train. The pelletizer may include the drying step to the preferred dryness or the formed pellets may then be transferred to a dryer, preferably a fluidized bed dryer to reach the preferred dryness. These other embodiments may also incorporate adjustments to control pH, dryness, nutrients in the product, shape, concentrations etc. to produce a plethora of fertilizers specific for different plants such as roses, rhododendrons, and any other flowers, vegetables, herbs, as well as specialty crops such as fruits and vegetables and unrelated products such as cat litters. Adjustments can also be made according to the geographic area in which the product is to be applied, to vary, for example, nutrients that may be inherently or otherwise missing in the location. Examples of such variations include the addition of calcium, potassium, phosphorus and metals such as magnesium, manganese, boron and zinc in different amounts.

Normal drying for final drying is conducted using a horizontal fluidized bed dryer, or a rotary drum dryer. The dried pellets or granules which are greater than 92 percent solids and preferably are greater than 95 percent solids and more preferably are greater than 98 percent and even more preferably are greater than 99 percent solids are then sized through one or more screens. The specification size may be varied dependent upon customer requirements, however, the range of suitable product for sale is between 0.5 mm and 4 mm with the commercial range for normal sized fertilizer is between 2 mm and 3 mm. The present invention also can manufacture a minimal sized product suitable for use in golf course applications which ranges from 0.5 mm to 1.3 mm. The proper sized material is separated and then cooled and then coated and then cooled in an apparatus, preferably a rotary drum, to less than 60° C. (140° F.), preferably to less than 49° C. (120° F.) and more preferably to less than 43° C. (110° F.). Cooling the granule or pellet optimally occurs in a rotary drum apparatus using ambient air or cooled air as from an ammonia evaporation cooler. Coating may occur in a coating vessel specifically for that purpose typically a rotary drum or a mixer. Alternatively, cooling and coating may be accomplished in a single vessel which cools the material and mixes the coating agent with the granules. Coating is with a de-duster or glazing material which minimizes dust generation during transport, storage and application. The finished coated granule or pellet is then conveyed to storage as finished high nitrogen containing bioorganic-enhanced inorganic ammonium fertilizer until shipment from the manufacturing site. Properly coated and dried pellets or granules have a hardness of greater than 5 pounds crush resistance in order to resist dusting and handling during transport, shipment and application. The de-duster coating or glazing material often requires a higher temperature, often 71° C.-105° C. (160° F. to 220° F.), to maintain a molten condition for application in the coating apparatus.

The granule storage facility or warehouse, usually incorporating bins or silos to contain the granules, must be dry to prevent agglomeration of the granules leading to degradation and destruction. The finished product is upon manufacture a sterile fertilizer having substantially no detectable amount of viable microorganisms, such as $E.\ coli$ or streptococci, or viruses harmful to animals or humans. Even upon storage the product has substantially no viable microorganisms which means that the fertilizer is microbially-safe and has no detectable amount or a detectable amount well below a threshold for safe handling and use of microorganisms originating from the organic materials. Although the fertilizer is rendered sterile during manufacturing, contamination can be expected from external air-borne microorganisms or by microorganisms deposited by animal or other contamination during storage or use. In any case, because the fertilizer product is dry and predominantly inorganic ammonium salts will not support microorganism multiplication at a rate which would lead to an animal or public health problem.

The fertilizer of the present invention is preferably chemically adjusted to fit the needs of nitrogen fertilizer requirements containing significant amounts of phosphate, sulfur and iron to enhance the targeted nitrogen (N) content of between 8 and 18 percent by weight, and preferably 16 weight-percent permitting significant commercial valuation.

FIGS. 1A-C and 2A-C provide schematic diagrams of embodiments of the present invention, wherein the process of these embodiments utilizes dewatered municipal biosolids combined with additional plant nutrients, ammonium salt fertilizers, and binding agents. In this example, the organics to be treated is a dewatered municipal biosolids, often referred to as a "biosolids cake." This biosolids are delivered to the manufacturing facility where they are stored in a storage bin or silo until the biosolids are ready to be conditioned. The conditioning initially takes place in a first pugmill by a vigorous mixing or blending with iron or other agent for odor control, which converts the thixotropic biosolids into a pumpable mix, paste, or paste-like mix. The iron reacts with reduced sulfur compounds and other odorants present in the biosolids. If phosphoric acid is added to this first pugmill it assists in modifying odorants present in the biosolids and contributes the majority of the phosphorus nutrient found in the final product. As the biosolids proceed through the equipment train additional plant nutrients can be infused into the mix. In this embodiment biosolids are optionally heated during their passage through the pugmill prior to being pumped to the first reaction vessel. In the preferred embodiment shown here one or two sulfuric acid streams (in a concentration range of 68 percent up to 105 percent sulfuric) are injected into the vessel where in the mix is acidified and liquefaction commences. Once the mix exits the first pressure vessel it is transferred under pressure into a second pressure vessel where the primary nitrogen infusion reaction occurs. In these figures, a sparger injects ammonia (or other nitrogen source) as a gas or liquid. This reaction in both vessels is carefully controlled to optimize temperature, pressure, retention time, and pH, all of which can be empirically determined based on the input organic materials and the desired output content of organics. The pressure vessels include a plurality of valves and controls that serve to automate the system. Additives can be used to control the temperature, pressure, and pH and nutrient levels. The nitrogen source that is pumped into the pressure vessel comprises a base, such as anhydrous (either liquid or vaporized) or aqueous ammonia. A mix of organics and ammonium sulfate and ammonium phosphate (if phosphoric acid is used) is formed that becomes molecularly integrated in that the ammonium ions become electrically bound to the amphoteric organic molecules from the biosolids thereby creating a slow release or enhanced efficiency of nitrogen in the final fertilizer granule. Similarly, this electric bonding can occur between the sulfate and phosphate and iron (or other plant useful metals such as magnesium, calcium, copper, manganese, boron or zinc) molecules present in the mix thereby rendering these nutrient molecules similarly to a slow-release or enhanced efficiency release state. This mix is maintained in a stress condition for a retention period as determined by its retention time (which in turn is based on the head pressure and release volume as described herein) as the mix moves through the pressure vessel. The stress condition preferably includes elevated temperature, and/or elevated pressure. The elevated temperature is produced partly or entirely by the exothermic reaction of the components, which can increase the temperature of the mix. In the preferred embodiment 100% of the elevated temperature is provided by the exothermic reaction. At these temperatures steam is generated from the mix. This steam is allowed to exit the pressure vessel under valve-controlled release, accomplishing a partial drying of the mix. The release of moisture from the exothermic heat allows the use of less fossil fuels such as natural gas to dry the fertilizer granules. This reduces the formation of carbon dioxide or greenhouse gas by approximately 40% compared to the production of heat dried biosolids or the production of standard commercial fertilizers such as urea. This generation of chemical heat makes the fertilizer of this invention very green and environmentally friendly. The stress condition the biosolids undergo in the pressure vessel and the retention period are controlled so as to result in the production of a mix that is sterile and that contains hydrolyzed macromolecules from the organics. Control of the stress condition and the retention period also results in the fusion of the ammonium ions formed with the organic molecules present creating an organic matrix which is a natural slow-release property for the nitrogen and other nutrients present, and the denaturization and or hydrolysis of many macromolecules present in the organics, such as proteins, plastics and other polymers. When such molecules are biologically active, this denaturization and/or hydrolysis renders them less active or inactive thereby creating a safer product for public usage or exposure. The retention time to induce the necessary fertilizer properties and biological inactivation are controlled by the continuous pumping and flow of the organics into the pressure vessel. This continuous flow processing of the invention versus the traditional batch processing of older plants aids the high throughput of this invention. The continuous flow also minimizes the problems associated with clogging of the process necessitating down time to clear the clog.

The liquid organics melt mixture flows from the pressure vessel and, optionally, is mixed with a hardening agent or agents and possibly additional nutrients to fine tune the fertilizer as desired. That mix is further treated by granulation or extrusion into granules such as pellets or other, smaller structures. The granules are dried in rotary dryer and passed through one or more screens to separate oversized materials and undersized materials from proper-sized materials. The oversized materials can be crushed in a crusher or mill. Subsequently, the undersized materials and the crushed oversized materials can be recycled to facilitate the granulation of the fertilizer mix. The resulting proper-sized granules are then dried in rotary cooler, sized, coated, cooled and stored. When a traditional granulator is used in the shaping process, ammoniation by vaporized ammonia and recycle addition may occur. Water removed from the mix as steam from the pressure vessel and from subsequent vessels as steam and/or water vapor may be condensed and preferably returned to the wastewater treatment plant (WWTP), or may be treated and discharged into adjacent water resources, or into the atmosphere. Water that is retained from the capture of ammonia in the process emission air is returned to a process water containment vessel or alternatively may be contained in a separate tank for conversion to a saleable liquid nitrogen-containing fertilizer. This liquid fertilizer may have its nutrient formulation directly changed by the addition of other nutrient compounds selected from the group: potash or other forms of potassium, e.g., potassium hydroxide or potassium sulfate, urea, thiosulfate, ammonium nitrate, urea ammonium nitrate (UAN), 10-34-0 liquid fertilizer, mono-ammonium phosphate, diammonium phosphate, zinc chloride, liquid ammonia, potash, iron containing compounds and or other traditional inorganic fertilizers.

For optimal odor control of the process and optimization of the odor of the resultant fertilizer from the present invention this process water may be treated with 25 percent to 50 percent liquid hydrogen peroxide to eliminate most of the chemical odorants associated with this process water before it is subsequently added to the biosolids mix immediately prior or in the first pugmill. Alternatively, the odorous process water can be treated with gaseous ozone which is bubbled by diffuser through the process water thereby also eliminating the majority of odorant associated with this water.

In another embodiment a series of reaction vessels may be used to accomplish the acid/base reactions described herein. In a preferred embodiment of the present invention the sequence of two reactor vessels can be utilized. In one optional embodiment a combination of one reactor vessel for acid reaction can be followed by an ammoniation conducted in a pipe-cross reactor. In another embodiment the reactions could be carried out in the sequence of a first pipe-cross reactor for acidification of the biosolids mix followed by the ammoniation conducted in a pressure vessel. Also described is an embodiment whereby the acidification reaction is conducted in a first pipe-cross reactor followed by the ammoniation reaction in a second pipe-cross reactor.

Another embodiment of the present invention can have the acidification of the biosolids mix to partly or fully occur in the first pugmill. The partly or fully acidified biosolids mix could then be treated by ammoniation in a first reaction vessel thereby eliminating the need for a second reaction vessel. If the mix were partially acidified the acid/base reaction could then be completed in this first vessel or the incomplete mix transferred to a second reactor vessel (or pipe-cross reactor) for completion.

Another embodiment of the invention is directed to a system for the manufacture of a product from organic materials treated in accordance with the method of the invention as described herein. The combination of pressure, heat and ammonia treatment destroys or otherwise inactivates toxins and other hazardous compounds that are present in an otherwise contaminated organic material. The resulting product may be used as a fertilizer or other nutrient or support for plants and/or animals. The fertilizer product of this invention is of homogeneous construction containing multiple nutrients.

Fertilizers made by the methods of the invention may optionally include one or more of anionic and cationic chemicals, chelating agents, ionic sequestering agents, metal ions, citric acid, amino acids, glutamic acid, histidine, lysine, glycine, peptides, proteins, sugars, saccharides and polysaccharides, iron, sulfur, phosphorous and nitrogen-binding compounds and combinations thereof. Nitrogen-binding agents include, for example, amino acids, lysine, peptides, polypeptides, ammonium-N. These agents can be utilized by plants even before they develop a nitrate-N reduction system and is as a result very energy efficient. Ammonium-N($NH_4^+$) in fertilizer of the invention requires less of the plants' stored metabolic energy for incorporation into plant components. Plants can use both ammonium and nitrate N but ammonium-N is a more energy efficient form of nitrogen for plants and is less leachable. That means that more sugars formed by photosynthesis can be stored in grain or fruit as starch resulting in increased yield. Utilizing ammonium nitrogen can save 10%-17% of photosynthetic energy which plants have stored.

Preferably, fertilizers of the invention, when applied to a crops, releases nutrients such as nitrogen to soil at a rate slower than such components are releases by fertilizer containing non-organic fertilizers such as fertilizers that use urea as the nitrogen source. Fertilizers of the invention are preferably supplemented with nutrients comprise one or more of nitrogen, phosphorus, potassium, sulfur, iron, manganese, magnesium, copper, calcium, selenium, boron, zinc and combinations thereof, and those nutrients are chelated or electrostatically bound to the organic matter of the fertilizer. Fertilizers of the invention are preferably homogenous in composition, non-hydroscopic and black or very dark in color. Crops to which the fertilizer of the invention are applied show improved soil tilth, stress resistance to heat and drought, and improved soil micro-ecology as compared to non-organic fertilizer. Preferably fertilizers have a hardness of between 4 and 9 pounds, more desirably between 6 and 8 pounds and/or a bulk density of between 52 and 56 pounds/cubic foot. Also preferably, fertilizers have a content of from 8-17% nitrogen, from 0-10% phosphorus, from 0-10% potassium, from 5-20% sulfur 5 to 20%, from 0-5% iron and from 5-20% organics. Preferably fertilizers of the invention, when applied to a crop, provides one or more nutrients to the crop sufficient for all or a portion (e.g., half, quarter) of a single growing season.

Fertilizer of the invention provides for an increased nutrient uptake by crops such as nitrogen. Crops show increased root growth and density, increased bulk and biomass and, preferably increased number and/or size of seed, fruits and/or flower. The ammonium ion negates the possibility of nitrogen losses by leaching and denitrification by soil bacteria which can be sizeable in nitrogen fertilizer that do not contain ammonium as compared to inorganic fertilizers. Preferably upon application to crops, the fertilizer does not lose greater than 5% of its contained nitrogen (N) to the atmospheric environment upon surface application to a dry soil and not more than 35% from a flooded soil. Preferably fertilizer delivers nutrients such as, for example, iron, nitrogen, phosphorous, in a plant-available form as compared to non-organic fertilizer.

Preferably crops to which have applied fertilizer of the invention show improved nutrient use and efficiency, such as iron, by retaining the iron primarily in the plant-available ferrous ion form, and contributes to the carbon nutrient pool available for crop production in the soil column.

The following examples illustrate embodiments of the invention, but should not be viewed as limiting the scope of the invention.

EXAMPLES

Example 1

Wet community organics comprised of biosolids from a municipal waste water plant are received at the fertilizer manufacturing plant of this invention with a percent solids of 16.0 percent. The plant is set up to operate at a wet biosolids processing rate of 220 wet tons per day. A portion of this 16% solids material was dried in a pre-dryer to 85% dry solids at a rate to yield sufficient 85% dry material to mix with the 16% material to yield a preferred percent solids of 20% to 26% but more preferably 22% to 24% solids. Additionally, a dry solids material of iron sulfate was mixed in the same mixer sufficient to yield a concentration of 3% iron in the finished fertilizer. This conditioned organics mix is then pumped into the first hydrolysis vessel wherein at the orifice of the pressure vessel it is mixed with 93% sulfuric acid in an amount pre-calculated to yield a degree of heat of hydration of 110° C. (230° F.) and a total of 17% sulfur in the finished fertilizer. The contents of the first pressure vessel are mixed vigorously at a rate of 360 RPM for six minutes within the vessel as the acidified mix gradually is forced to the upper quarter of the vessel where in it is discharged after six minutes of reaction in the first vessel. In this first vessel the contained proteins from the community organics are hydrolyzed to various length polypeptides and monomeric amino acids. Other macro-organic compounds are also hydrolyzed to smaller molecular forms thereby increasing the fluidity of the contents of the vessel to preferably less than 1000 cP. This fluidized acidified mix is then transferred under pressure to the bottom orifice of the second pressure vessel or the ammoniation vessel wherein it is mixed with vaporized anhydrous ammonia sufficient to raise the temperature of the mix to over 150° C. (300° F.) and the internal pressure of the second vessel of over 35 psi and sufficient to cause the concentration of nitrogen (N) in the final formulation of the resultant fertilizer to between 16% and 17% nitrogen by dry weight of the finished product. The ammoniated mix is maintained in the second pressure vessel for six minutes of reaction time before it is discharged through an orifice that can be valve controlled to the granulator. The discharged mix or melt is slightly increased in viscosity compared to the discharge of the first pressure vessel but preferably less than 1200 cP. This discharged melt is under pressure and therefore when it enters the granulator is sprayed onto a receiving bed of crushed fertilizer material or undersized fertilizer material or fertilizer dust material collected from the various dust collectors contained in the process air treatment system. The spray coats the receiving fertilizer material and gradually builds up a series of coatings or agglomerated material such that the granular fertilizer is produced in which the majority of the material is of the proper product size such as the 1.7 mm to 3.0 mm (170 sgn to 300 sgn; "size guide number") diameter granules that are suitable for use in commercial agriculture. The granulator in this example also received an amount of potash sufficient to cause the final concentration of potassium to be 2% by dry weight of the finished product. The granulator also received an amount of molasses sufficient to cause the hardness of the finished granules to reach a range of 5 lbs. to 8 lbs. crush strength (e.g., from 0-2% by weight, preferably less than 1%). This material is then dried to over 98% solids in a rotary drum dryer and then screened to one of three commercial sizes of 1.7 mm to 1.9 mm, 1.2 mm to 1.4 mm, and to 2.6 mm to 3.0 mm. All smaller material is returned to the granulator as part of the recycle bed. All larger material is crushed in a chain mill and then returned to the granulator as part of the recycle. A portion of the proper sized product, preferably 2.6 mm to 3.0 mm for commercial product size, may also be returned to the recycle bed to maintain the mass balance of the production process. All of the steps of this process were maintained in this example under negative pressure so that no process dust or odors are released into the manufacturing environment. All process air was treated through a robust odor control system such that no noxious odors were perceived at the fence line of the manufacturing property. Scrubbed nutrients such as ammonium, now ammonium sulfate, were returned to a process water tank wherein it was added to the first mixer to help control the solids and fluidity of the conditioned mix entering the first pressure vessel. In this way the efficiency of the manufacturing process can be optimized so that the only discharges from the fertilizer manufacturing process are treated condensed water (from the municipal organic material and any cooling water that may need to be discharged from the cooling system) along with the treated process air. In the fertilizer manufactured by this process described the slow release percentage of nitrogen was 30% of the total nitrogen in the product. This slow release nitrogen is in the form of an organic matrix in which the positive charged ammonium ion is electrostatically bound to a negative charge on the organic compounds such as polypeptides and amino acids that comprise the core of the matrix. The product of this example of the invention contained a 99% dry granular fertilizer with a nutrient formulation of 16-1-2-17-3-16 (N—P—K—S—Fe-Organic) by dry weight of the finished granular in which 33% of the nitrogen is in a slow-release form.

Example 2 Ammonia Absorption

In this example the fertilizer was manufactured by a similar process with the difference that an amount of ammonia absorbing compound, such as Nutrisphere-N (commercially available from Verdesian Life Sciences), a proprietary nitrogen binding agent, was added into the granulator such that the slow-release component of the N is increased to 45% N from the standard 30% of total N. This increases the commercial value of the fertilizer and rendered 15% more of the contained nitrogen available in the stages of crop growth later than 2 weeks following the original field application of the fertilizer product.

Example 3 Nitrogen Release Profiles

Figure 6:
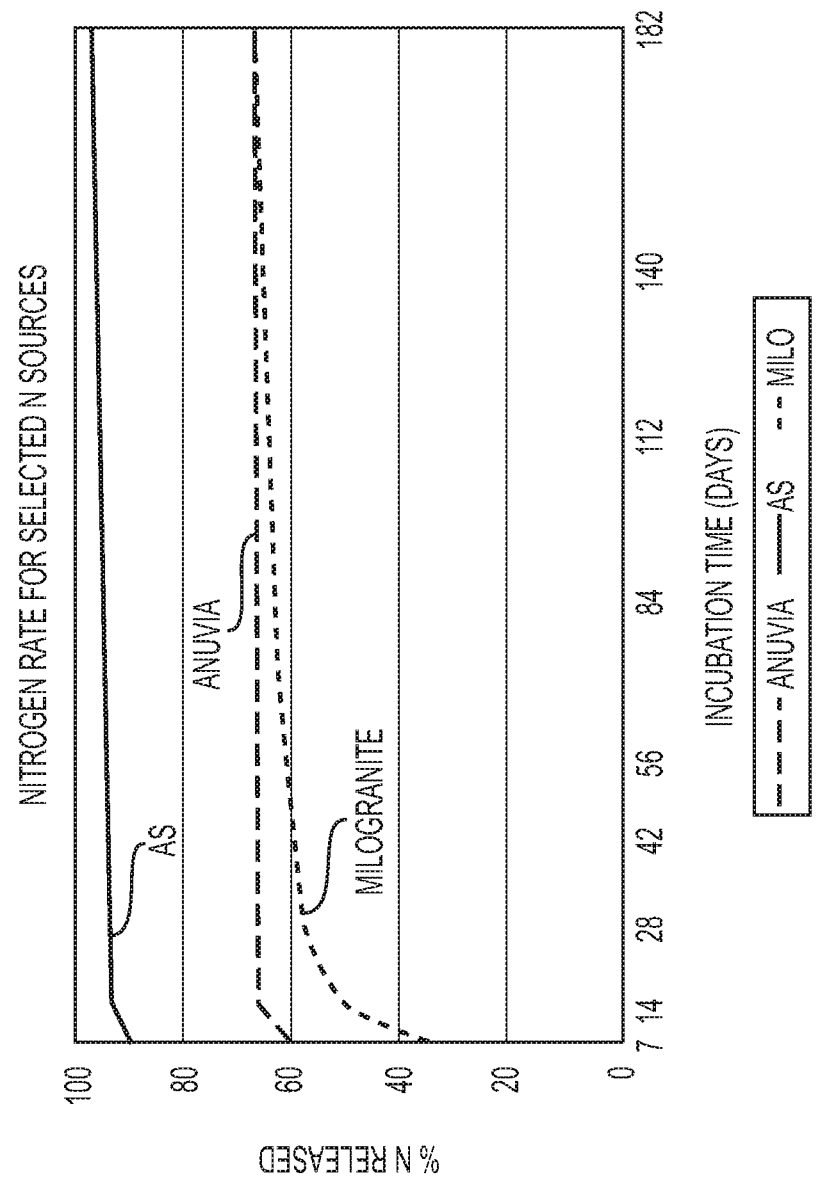
FIG. 6. Nitrogen release curve showing percent nitrogen released into soil over number of days for ammonium sulfate (AS), organically-modified ammonium sulfate of the invention (Anuvia), and conventional biomass (MILORGANITE).

Nitrogen release profiles of the organically modified ammonium sulfate of the invention are determined in comparison to traditional, pure ammonium sulfate fertilizer and pure biosolids as controls. First, ammonium sulfate is applied over sterilized sand in a laboratory environment (ambient temperatures with no sun, water or soil organisms) and allowed to permeate the sand over a period of time. As can be seen in FIG. 6, about 90% of the nitrogen of AS is released through the sand within about one week of application. In comparison, about 35% of the nitrogen of traditional biosolids is released which increased to about 70% over two weeks where it remained. Organically augmented ammonium sulfate of the invention released about 60% of its nitrogen within the first week which increased to about 70% over two weeks.

Also, a theoretical nitrogen release profile is determined for these same three fertilizer materials in normal soil. Soil is presumed to contain microorganisms that break down nitrogen-containing molecules thereby releasing additional nitrogen into the soil. As can be seen in FIG. 7, ammonium sulfate again releases its nitrogen content within the first week. Pure biosolids release only about 30% of its nitrogen in the first two weeks, which gradually increases to about 90% over a period of 26 weeks. However, organically modified ammonium sulfate prepared according to the processes of the invention releases just under 60% of its nitrogen over two weeks which gradually increased to about 90% over the next 26 weeks. Thus, organically modified ammonium sulfate fertilizer prepared according to the processes of the invention initially releases just over half of its nitrogen and slowly releases the remaining half over a period of weeks to months. This two-stage nitrogen release profile (e.g., dual-release, two-step release, combined fast/slow release) is characteristic of the fertilizers of the invention.

Example 4. Ammonium Nitrogen

Figure 11:
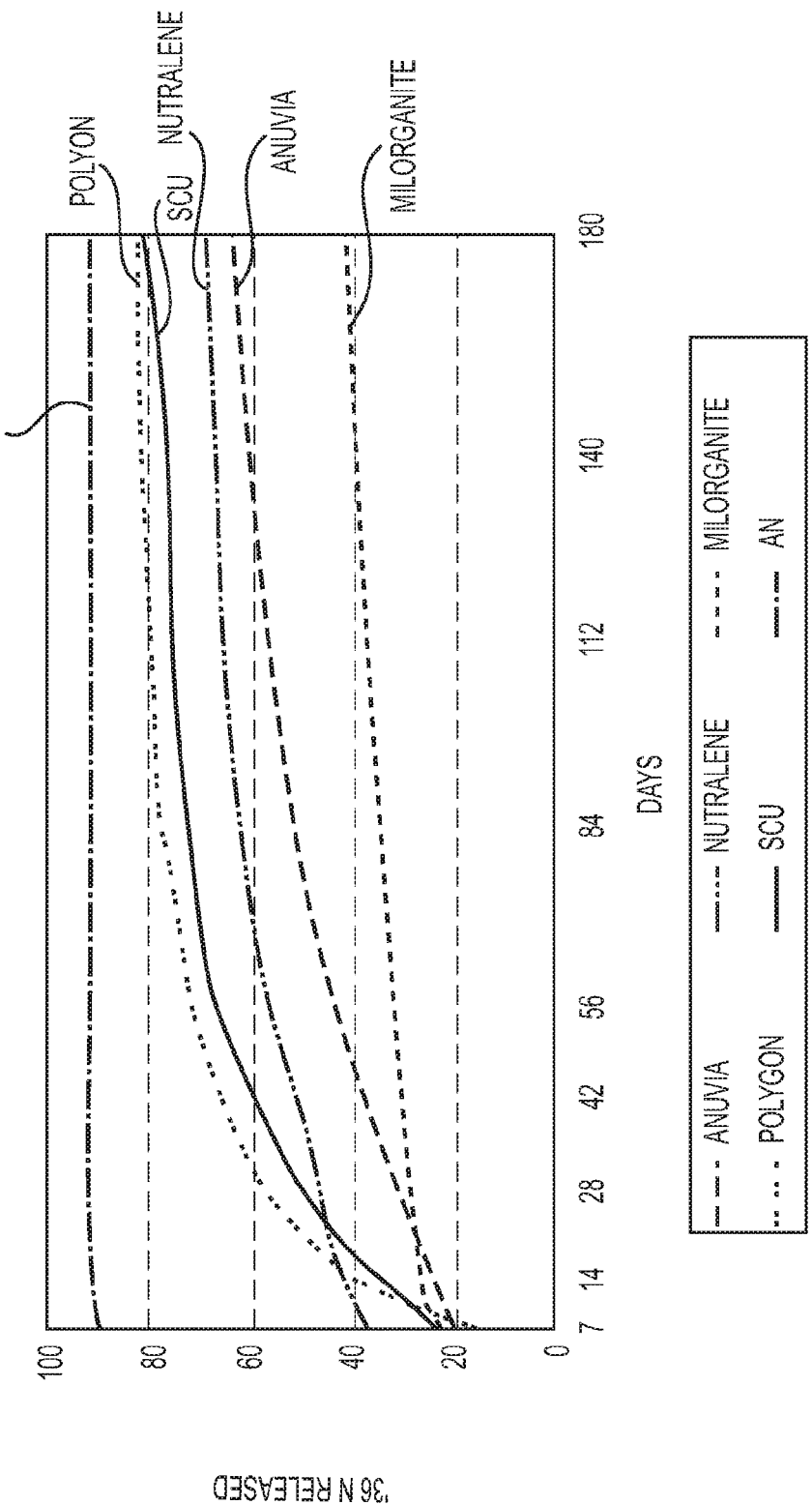
FIG. 11. Graph showing percent nitrogen releases over time for selected materials.

One product of the invention contains 16% nitrogen primarily in the ammonium form. Depending on the situation where the product nutrient is applied, this amount will provide sufficient nitrogen or the product can be supplemented by blending with additional nitrogen sources. Normally when plants are fertilized, they have a high demand for nitrogen to drive the rapid growth and development. The product releases approximately 60% of its nitrogen immediately in the form of $NH_4^+$—N, which is readily available and usable by plants (see FIG. 11). Ammonium-N can be utilized by plants even before they develop a nitrate-N reduction system which is energy efficient as well. The efficient utilization of nitrogen early in growth produces sturdier plants that have increased disease resistance and greater growth potential in all respects including root density, leaf number and broadness, and flower and seed production. Nitrogen uptake as ammonium negates the possibility of nitrogen losses by leaching and denitrification by soil bacteria which can be sizeable. The balance of the product nitrogen becomes available via the natural slow release mechanism of bacterial action which can break the bonds between the OM and the nitrogen as shown in FIG. 11. This system can be altered by variations of soil type, temperature, and other parameters.

Figure 9A:
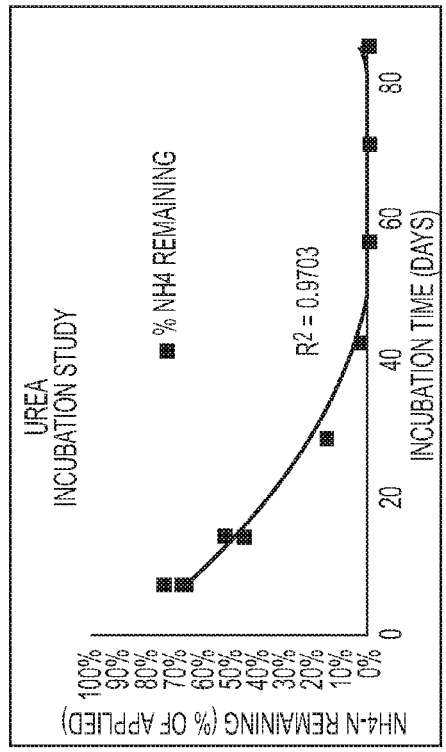
FIGS. 9 (A-C). Controlled condition nitrification study results using Anuvia product (FIG. 9A), using urea (FIG. 9B), and using urea plus agrotain (FIG. 9C).
Figure 9B:
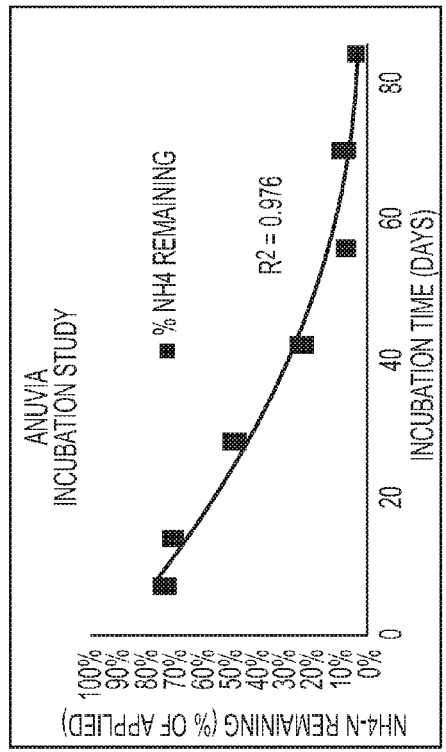
Figure 9C:
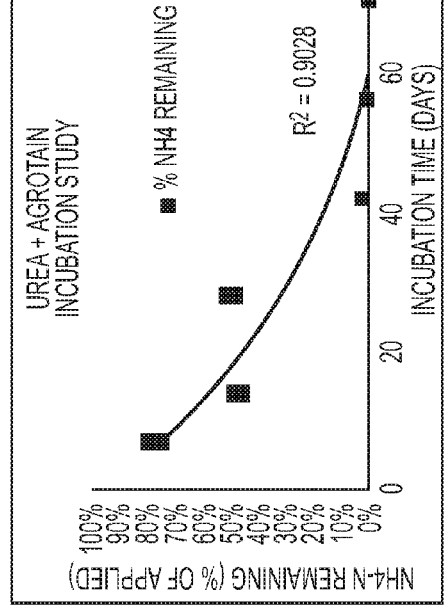

A controlled nitrification study was performed with product of the invention (Anuvia), urea and urea plus agrotain. Results are shown in FIG. 9 which demonstrates that the fertilizer product of the invention (FIG. 9A) converts nitrogen more slowly that commercial urea (FIG. 9B) or urea plus agrotain (urease inhibitor) (FIG. 9C).

Example 5

Figure 10:
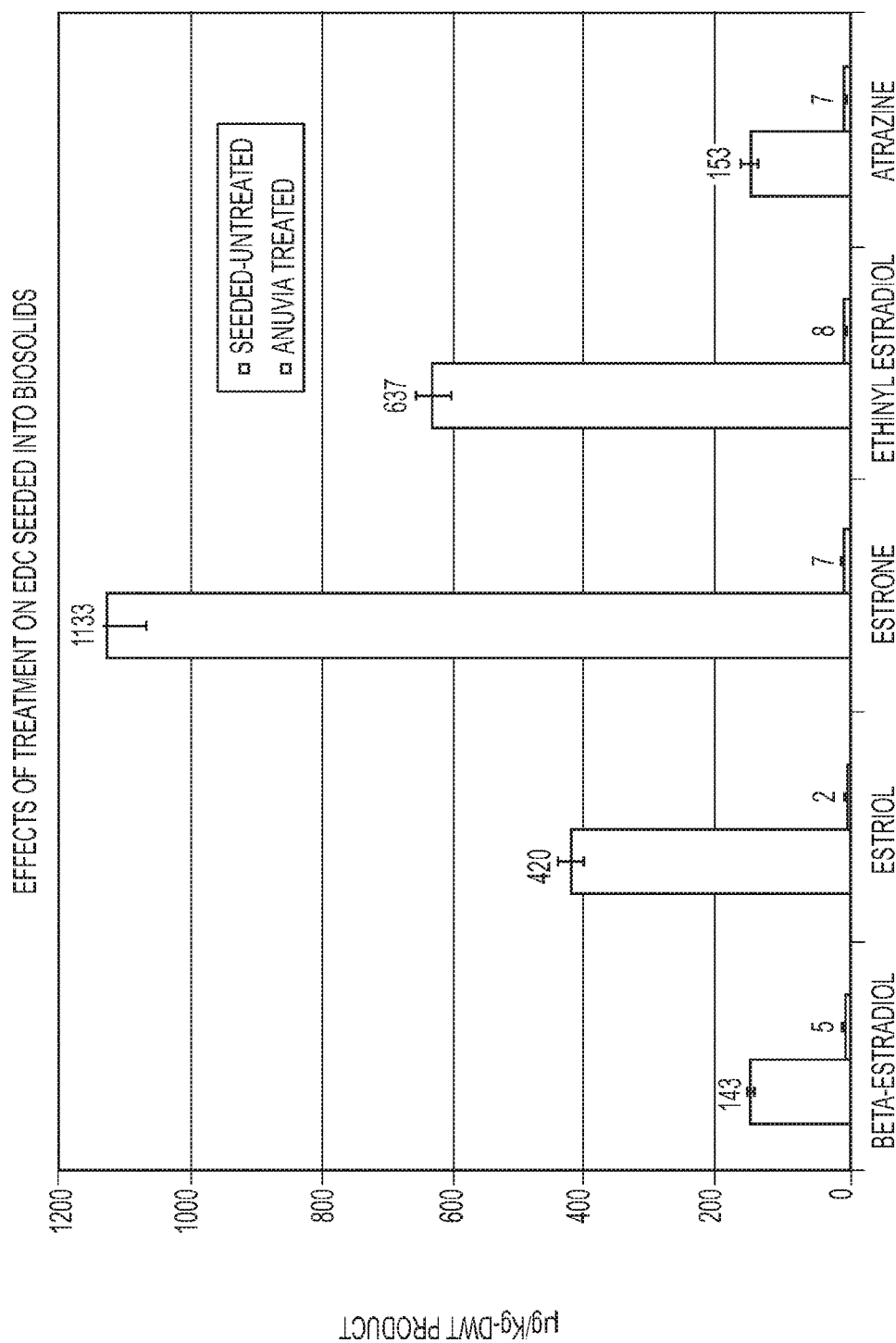
FIG. 10. Effects of treatment of endocrine disrupting chemicals (EDC) seeded into bio solids.

Four female hormones and a common herbicide were quantitatively mixed with a wet municipal biosolids cake prior to the biosolids being processed by an embodiment of the invention. The combination of process stresses, such as extremely low pH of less than 0.1 pH in temperature environment greater than 110° C. (230° F.) for six minutes followed by exposure to vaporized anhydrous ammonia under a pressure of 40 psi and a temperature of 200° C. (390° F.) for six additional minutes, caused a loss of over 96% of the detectability of these endocrine disruptor compounds (see FIG. 10). Such a molecular destruction by the process of the present invention of bioactive compounds that can be found in municipal organic materials renders the resultant fertilizer product inherently safer.

Example 6. Potassium

Plants require potassium (K) is amounts second only to nitrogen. Potassium in fertilizers is often referred to as potash and listed in fertilizer analyses as $K_2O$. However, plants take up and utilize only the potassium ion. Potassium impacts crop quality and is particularly important in carbohydrate and starch synthesis, making adequate potassium critical for high-carbohydrate crops like potatoes, sugar cane, sugar beets, citrus and grapes. It is an enzyme activator that helps plants withstand moisture stress and helps perennial crops like alfalfa avoid winter kill by ensuring the plants have enough stored starch in their roots to get through the winter. Potassium, like nitrogen, also helps plants produce protein as they grow. Potassium effects on crops include: increased weight per kernel and more kernels per ear in corn; increased oil content in soybeans; improved milling and baking quality in wheat. Potassium can be plentiful in some soils, but as with nitrogen (N) and phosphorus (P), the problem is availability. Up to 98 percent of potassium in the soil is unavailable to plants in its existing form. The fertilizer product described herein contains a modest amount of this essential element in the potassium cation form ($K^+$) but can be supplemented in the formulation or in the crop fertilization program by blending with other blended fertilizers.

Example 7. Sulfur

Sulfur is an essential nutrient in crop production and has been classified as a secondary element, along with Mg and Ca, but now is more commonly considered "the 4th major nutrient". Some crops can take up as much sulfur S as phosphorus. Sulfur has become more important as a limiting nutrient in crop production in recent years for several reasons. These include higher crop yields that require more sulfur, less sulfur impurities in modern fertilizers, less use of sulfur-containing pesticides, reduced industrial sulfur emissions to the atmosphere, and a greater awareness of sulfur needs. Plants can only use sulfate-S, which is susceptible to leaching like nitrate.

Sulfur serves many functions in plants. It is essential in the formation of amino acids, proteins, and oils. It is necessary for chlorophyll formation, promotes nodulation in legumes and is essential for atmospheric nitrogen ($N_2$) fixation, helps develop and activate certain enzymes (nitrate reductase), and is a structural component of two of the 21 amino acids that form protein. Sulfur also provides plant health benefits in crop production. The form in which the product delivers sulfur ($SO_4$=Sulfate ion) is the only form that the plant can utilize.

The plant essential sulfate sulfur in the product of the invention is both immediately and slowly available to plants and in a usable form. This is in contrast to other sulfur containing products which contain elemental sulfur which must be oxidized by soil bacteria to the sulfate form in order for it to be utilized by plants. That process is affected by a number of factors including size of the elemental sulfur particles, soil temperature, soil pH, soil moisture and the activity of sulfur-oxidizing organisms in the soil. Sulfur binding to the organic matrix in the product is less leachable under excessive rainfall conditions than sulfur from ammonium sulfate.

Example 8. Iron

Iron (Fe) is one of the essential micronutrients which include zinc (Zn), manganese (Mn), copper (Cu), molybdenum (Mo) and boron (B). Iron is involved in many biochemical processes in plants including photosynthesis, respiration (utilization of stored sugars), oxidation-reduction reactions, symbiotic nitrogen fixation by legumes (*Rhizobia* bacteria) and the formation of chlorophyll. Iron deficient plants are notoriously chlorotic and severity of the chlorosis varies with the genetics of the particular plant species. The problem develops as soon as the plants germinate and grows worse as time goes by. Plants can only use ferrous iron ($Fe^{+2}$). Most of the iron in the soil is in the unavailable ferric ($Fe^{+3}$) form. When iron is added to the soil in an inorganic form such as ferrous sulfate ($FeSO_4$), normal soil reactions quickly convert (oxidize) it to the ineffective ferric form. High soil pH and low organic matter content contribute to iron availability and uptake problems. Conditions in the rhizosphere (region around plant roots) have tremendous effects on Fe availability and uptake and vary widely with varietal differences in the same species.

Over the years, many types of iron-containing fertilizers have been developed but few have been both effective and economic. Soil applications have been particularly ineffective. High cost chelated forms of iron have been the most effective but economics have been a limiting factor. Foliar sprays or frequent applications of very acidic iron fertilizers have diminished the chlorosis but must be repeated several times during the growing season. Yet, the conditions remain and the problems recur.

The sequestered ferrous iron in product of the invention is less subject to the undesirable soil oxidation reactions which convert to the unavailable ferric iron form. The products' organic matrix provides an excellent vehicle to effectively deliver iron in the ferrous form which is usable by plants. Having iron available in a usable ferrous form contributes to the carbon nutrient pool, improving ion exchange, improving the micro-ecology in the root zone, improving soil tilth, and increasing plant stress resistance to heat and drought.

Example 9. Lower Ammonia Volatilization and Higher Crop Yields

An ammonia volatilization study conducted by IFDC on two soils under upland and flooded conditions, demonstrated that the invention's fertilizer product had significantly lower $NH_3$—N volatilization loss than urea. In general, the fertilizer of the invention had similar $NH_3$—N volatilization losses as ammonium sulfate on both the soils and under both flooded and upland conditions. However, on the upland soil, the Invention's fertilizer had significantly lower losses at 2.5% of applied N fertilizer, compared with ammonium sulfate at 3.2%. Compared to urea where the percentage of applied nitrogen loss due to $NH_3$—N volatilization under upland conditions was 27-33%, the $NH_3$—N volatilization loss by the invention's fertilizer was only 2.5-3% of applied nitrogen fertilizer. Under flooded conditions percentage of applied nitrogen loss from urea due to $NH_3$—N volatilization loss was 59% and 61% for the two soils, while invention product losses were 26 percent and 32 percent. Field studies of rice fertilization in Arkansas showed a 20 bushel per acre average yield advantage for a hybrid rice with the invention's fertilizer compared to urea when applied to the soil surface 1-10 days prior to flood.

Example 10

In this example, a higher percentage slow-release nitrogen is created. In Example 1 above the product of the invention contained 325 pounds of organic material per 1 ton of product. This one ton of product contains 16% nitrogen or 320 pounds of nitrogen per ton of product. Of this 320 pounds of nitrogen, 33% is slow-release (105.6 pounds) as a result of the formation of the organic matrix complexes whereby the positive charged ammonium ions and the negative charged sulfate ions are electrostatically bound to the opposite charges contained in the amphoteric organic molecules contributed by the community organic materials. In other words, the efficiency of slow-release nitrogen is 105.6 pounds of slow-release nitrogen for every 325 pounds of municipal organics contained in the final product mass or 105.6/325 equals 32.5 percent. By increasing the total organic mass of the final fertilizer product with additional community organics such as biosolids, as in replacing other heavier components of the fertilizer, the two percent potassium mass in the product in the Example 1, the amount of organic in the final product is increased to 433 pounds, that is a final product nutrient composition of 16-1-0-17-21. At an average efficiency of 32.5% which yields a new amount of slow-release nitrogen of 140.7 pounds or an increase of 44.7 pounds of slow-release nitrogen per ton of the product of this invention. The percent slow-release nitrogen in this example is increased from 33% to 140.7/322.5 (2.5 pounds of N are contributed by the additional 40 pounds of organics=43.6 percent. Substitutions are made for different amounts of the potassium or the iron component in the fertilizer composition to produce the desired or specific amount of slow-release nitrogen without changing the amount of added total nitrogen in the final product of the invention.

Other embodiments and uses of the invention will be apparent to those skilled in the art from consideration of the specification and practice of the invention disclosed herein. All references cited herein, including all publications, U.S. and foreign patents and patent applications such as U.S. Pat. No. 8,105,413; U.S. Pat. No. 7,662,205, U.S. Pat. No. 7,513,927, U.S. Pat. No. 7,662,206, U.S. Pat. No. 7,947,104, and U.S. Pat. No. 8,992,654, are specifically and entirely incorporated by reference. The term comprising, where ever used, is intended to include the terms consisting and consisting essentially of. It is intended that the specification and examples be considered exemplary only with the true scope and spirit of the invention indicated by the following claims.

The invention claimed is:

1. A method for manufacture of a fertilizer with a predetermined nutrient release profile comprising:
    conditioning an amount of an organic material to a predetermined degree of wetness, wherein the type and/or amount of organic material establishes the slow release nutrient profile of the fertilizer;
    adding an odor control agent to the conditioned organic material to form a mixture;
    transferring the mixture to a first vessel to which is added a concentrated acid creating an exothermic reaction, wherein the amount of acid added creates a predetermined temperature forming a liquid mixture;
    agitating the acidified mixture for a first period of time;
    transferring the liquid mixture under pressure to a second vessel to which is added an amount of anhydrous ammonium sufficient to further increase the temperature and pressure of the liquid mixture such that the liquid mixture contains ammonium ions and a predetermined amount of nitrogen;
    agitating the liquid mixture in the second vessel for a second period of time wherein the ammonium ions non-covalently bind to organic and other chemical compounds of the fertilizer; and
    discharging the liquid mixture from the second vessel to form the fertilizer with a predetermined slow release profile, wherein the predetermined slow release profile is a profile of one or more of nitrogen, phosphorous, potassium, sulfur, iron, organics and combinations thereof.

2. The method of claim 1, wherein the nutrient release profile generally matches the growth needs of a particular crop for the one or more of nitrogen, phosphorous, potassium, sulfur, iron, organics and combinations thereof.

3. The method of claim 1, wherein the nutrient release profile comprises the rate, amount and/or differential of release of one or more nutrients of the fertilizer.

4. The method of claim 1, wherein the organic material comprises one or more of municipal biosolids, heat-dried biosolids, pharmaceutical fermentation wastes, microbial digests of organic products, agricultural waste products, food stuffs and digested food stuffs, food byproducts, animal manures, digested animal manures, organic biosolids, biosolids containing microorganisms, wastewater plant biosolids, extracted liquid organic fractions from municipal solid waste, animal residuals and digested animal residuals, algae harvested from eutrophic surface water sources, iron humates containing fulvic and/or humic acids, and combinations thereof.

5. The method of claim 1, wherein the predetermined degree of wetness comprises a percent solids of from 15-30%.

6. The method of claim 1, wherein the aqueous liquid removed from the organic material is recycled.

7. The method of claim 1, wherein the odor control agent comprises one or more of calcium ferrate, sodium ferrate, potassium ferrate, ferrous sulfate heptahydrate, rozenite, melanterite, ferric chloride, ferrous sulfate, ferrous sulfate monohydrate, hydrogen peroxide, ozone and salts, derivatives and combinations thereof.

8. The method of claim 1, wherein the concentrated acid comprises sulfuric acid or phosphoric acid concentrated at 90% or greater.

9. The method of claim 1, wherein the amount of acid creates a temperature of 100° C. or greater.

10. The method of claim 1, wherein the first period of time is from 2-20 minutes.

11. The method of claim 1, wherein the second vessel has a pressure of 2 atmospheres or greater and a temperature of 120° C. or greater.

12. The method of claim 1, wherein the first and second vessels are at ambient pressure.

13. The method of claim 1, wherein the predetermined amount of ammonium is that amount which creates 5% or greater of nitrogen in the fertilizer.

14. The method of claim 1, wherein the second period of time is 5 minutes or greater.

15. The method of claim 1, wherein the discharging comprises coating the liquid fertilizer onto recycled fertilizer granules.

16. The method of claim 1, wherein the coated recycled fertilizer granules are dried.

17. The method of claim 1, wherein the organic material contains plastic and hair and the method does not require removal of either before processing.

18. The method of claim 1, wherein the liquid mixture has a viscosity of 2,000 cP or less.

19. The method of claim 1, wherein the liquid mixture has an increased viscosity after addition of anhydrous ammonium.

20. The method of claim 1, wherein the fertilizer is dried to a solids content of at least 98 percent.

21. The method of claim 1, further comprising adding a hardening agent to the fertilizer selected from the group consisting of ligno-sulfonate, molasses, alum or a combination thereof or wherein no hardening agent is utilized.

22. The method of claim 1, further comprising adding zinc sulfate and/or soluble forms of boron to the organic material, the mixture and/or the liquid mixture.

23. The method of claim 1, further comprising adding nutrients, peptides, vitamins, polypeptides, amino acids, saccharides, polysaccharides, herbicides and/or pesticides to the organic material, the mixture and/or the liquid mixture.

24. The method of claim 1, further comprising adding one or more agents that create and/or reduce that electrostatic state of the organic material to the organic material, the mixture and/or the liquid mixture.

25. The method of claim 24, wherein the one or more agents comprise one or more of anionic and cationic chemicals, chelating agents, ionic sequestering agents, metal ions, citric acid, amino acids, glutamic acid, histidine, lysine, glycine, peptides, proteins, sugars, saccharides and polysaccharides, iron, sulfur, phosphorous and nitrogen-binding compounds and combinations thereof.

26. The method of claim 1, wherein the fertilizer comprises granules.

27. The method of claim 26, further comprising selecting granules by size.

28. The method of claim 27, wherein granules selected are between 0.5 and 4 mm.

29. The method of claim 27, wherein the granules selected that are of greater than 4 mm are crushed and combined with granules selected that are of less than 0.5 mm and comprise recycled fertilizer granules.

30. A method for manufacture of a fertilizer with a predetermined nutrient release profile comprising:
conditioning an amount of an organic material to a predetermined degree of wetness, wherein the type and/or amount of organic material establishes the slow release nutrient profile of the fertilizer;
transferring the mixture to a first vessel to which is added a concentrated acid creating an exothermic reaction, wherein the amount of acid added creates a predetermined temperature forming a liquid mixture;
agitating the acidified mixture for a first period of time;
transferring the liquid mixture under pressure to a second vessel to which is added an amount of anhydrous ammonium sufficient to further increase the temperature and pressure of the liquid mixture such that the liquid mixture contains ammonium ions and a predetermined amount of nitrogen;
agitating the liquid mixture in the second vessel for a second period of time wherein the ammonium ions non-covalently bind to organic and other chemical compounds of the fertilizer; and
discharging the liquid mixture from the second vessel to form the fertilizer with a predetermined slow release profile, wherein the predetermined slow release profile is a profile of one or more of nitrogen, phosphorous, potassium, sulfur, iron, organics and combinations thereof.

31. The method of claim 30, wherein the nutrient release profile generally matches the growth needs of a particular crop for the one or more of nitrogen, phosphorous, potassium, sulfur, iron, organics and combinations thereof.

32. The method of claim 30, wherein the organic material comprises one or more of municipal biosolids, heat-dried biosolids, pharmaceutical fermentation wastes, microbial digests of organic products, agricultural waste products, food stuffs and digested food stuffs, food byproducts, animal manures, digested animal manures, organic biosolids, biosolids containing microorganisms, wastewater plant biosolids, extracted liquid organic fractions from municipal solid waste, animal residuals and digested animal residuals, algae harvested from eutrophic surface water sources, iron humates containing fulvic and/or humic acids, and combinations thereof.

33. The method of claim 30, further comprising adding an odor control agent, wherein the odor control agent comprises one or more of calcium ferrate, sodium ferrate, potassium ferrate, ferrous sulfate heptahydrate, rozenite, melanterite, ferric chloride, ferrous sulfate, ferrous sulfate monohydrate, hydrogen peroxide, ozone and salts, derivatives and combinations thereof.

34. The method of claim 30, wherein the amount of acid creates a temperature of 100° C. or greater.

35. The method of claim 30, wherein the second vessel has a pressure of 2 atmospheres or greater and a temperature of 120° C. or greater.

36. The method of claim 30, wherein the first and second vessels are at ambient pressure.

37. The method of claim 30, wherein the organic material contains plastic and hair and the method does not require removal of either before processing.

38. The method of claim 30, wherein the liquid mixture has a viscosity of 2,000 cP or less after addition of anhydrous ammonium.

39. The method of claim 30, wherein the fertilizer is dried to a solids content of at least 98 percent.

40. The method of claim 30, further comprising adding zinc sulfate and/or soluble forms of boron to the organic material, the mixture and/or the liquid mixture.

41. The method of claim 30, further comprising adding nutrients, peptides, vitamins, polypeptides, amino acids, saccharides, polysaccharides, herbicides and/or pesticides to the organic material, the mixture and/or the liquid mixture.

42. The method of claim 30, further comprising adding one or more agents that create and/or reduce that electrostatic state of the organic material to the organic material, the mixture and/or the liquid mixture.

43. The method of claim 42, wherein the one or more agents comprise one or more of anionic and cationic chemicals, chelating agents, ionic sequestering agents, metal ions, citric acid, amino acids, glutamic acid, histidine, lysine, glycine, peptides, proteins, sugars, saccharides and polysaccharides, iron, sulfur, phosphorous and nitrogen-binding compounds and combinations thereof.

44. The method of claim 30, wherein the fertilizer comprises granules.

45. The method of claim 44, wherein granules are selected by size with the sizes being less than 0.5 mm, between 0.5 and 4 mm, and greater than 4 mm.

46. The method of claim 1, wherein the liquid mixture is sterile.

47. The method of claim 30, wherein the liquid mixture is sterile.

\* \* \* \* \*